(12) United States Patent
Noda et al.

(10) Patent No.: US 7,955,549 B2
(45) Date of Patent: Jun. 7, 2011

(54) METHOD OF MANUFACTURING MULTILAYER NONWOVEN FABRIC

(75) Inventors: Yuki Noda, Kagawa (JP); Hideyuki Ishikawa, Kagawa (JP); Satoshi Mizutani, Kagawa (JP); Akihiro Kimura, Kagawa (JP)

(73) Assignee: Uni-Charm Corporation, Ehime (JP)

( * ) Notice: Subject to any disclaimer, the term of this patent is extended or adjusted under 35 U.S.C. 154(b) by 0 days.

(21) Appl. No.: 12/511,115

(22) Filed: Jul. 29, 2009

(65) Prior Publication Data
US 2009/0282660 A1 Nov. 19, 2009

Related U.S. Application Data

(62) Division of application No. 11/762,421, filed on Jun. 13, 2007.

(30) Foreign Application Priority Data

Jun. 23, 2006 (JP) ................................. 2006-174505
Sep. 29, 2006 (JP) ................................. 2006-270107

(51) Int. Cl.
*B29C 51/00* (2006.01)
(52) U.S. Cl. ......... 264/510; 264/505; 264/546; 264/154
(58) Field of Classification Search ........................ None
See application file for complete search history.

(56) References Cited

U.S. PATENT DOCUMENTS

| | | | |
|---|---|---|---|
| 3,485,706 A | 12/1969 | Evans | |
| 4,016,317 A | 4/1977 | Kalwaites | |
| 4,016,319 A | 4/1977 | Marshall | |
| 4,038,452 A | 7/1977 | Kobayashi et al. | |
| 4,190,695 A | 2/1980 | Niederhauser | |
| 4,379,799 A | 4/1983 | Holmes et al. | |
| 4,582,666 A * | 4/1986 | Kenworthy et al. | .......... 264/557 |
| 4,612,226 A | 9/1986 | Kennette et al. | |
| 4,695,500 A | 9/1987 | Dyer et al. | |
| 4,735,842 A | 4/1988 | Buyofsky et al. | |
| 4,787,947 A | 11/1988 | Mays | |
| 4,835,042 A | 5/1989 | Dohzono et al. | |
| 4,840,829 A | 6/1989 | Suzuki et al. | |
| 5,607,414 A | 3/1997 | Richards et al. | |
| 5,613,962 A * | 3/1997 | Kenmochi et al. | ............ 604/378 |

(Continued)

FOREIGN PATENT DOCUMENTS

CN 1294904 5/2001

(Continued)

OTHER PUBLICATIONS

Office Action issued to U.S. Appl. No. 11/762,421, mailed Oct. 6, 2009.

(Continued)

*Primary Examiner* — Monica A Huson
(74) *Attorney, Agent, or Firm* — Lowe, Hauptman, Ham & Berner, LLP

(57) ABSTRACT

A method of manufacturing a multilayer nonwoven fabric includes a supporting step of arranging on a predetermined surface of a permeable supporting member a multilayer fiber aggregate, a moving step of moving the multilayer fiber aggregate supported on the permeable supporting member in a prescribed direction by a predetermined moving device, and a spraying step of spraying a fluid onto the multilayer fiber aggregate moved in the prescribed direction in the moving step from the second surface by a predetermined spraying device.

13 Claims, 23 Drawing Sheets

U.S. PATENT DOCUMENTS

| | | | |
|---|---|---|---|
| 5,618,610 A | 4/1997 | Tomita et al. | |
| 5,733,625 A | 3/1998 | Tsuchiya et al. | |
| 5,897,547 A | 4/1999 | Schmitz | |
| 5,900,109 A | 5/1999 | Sanders et al. | |
| 6,039,555 A | 3/2000 | Tsuji et al. | |
| 6,096,016 A * | 8/2000 | Tsuji et al. | 604/378 |
| 6,395,957 B1 | 5/2002 | Chen et al. | |
| 6,451,718 B1 | 9/2002 | Yamada et al. | |
| 6,582,798 B2 | 6/2003 | Thomas | |
| 6,586,076 B1 | 7/2003 | Mizutani et al. | |
| 6,610,173 B1 | 8/2003 | Lindsay et al. | |
| 6,641,902 B1 | 11/2003 | Kobayashi et al. | |
| 6,855,424 B1 | 2/2005 | Thomas et al. | |
| 6,867,156 B1 | 3/2005 | White et al. | |
| 6,936,333 B2 | 8/2005 | Shizuno et al. | |
| 7,507,463 B2 | 3/2009 | Noda et al. | |
| 7,553,535 B2 | 6/2009 | Noda et al. | |
| 7,662,462 B2 | 2/2010 | Noda et al. | |
| 2002/0010449 A1 | 1/2002 | Mizutani | |
| 2003/0198784 A1 | 10/2003 | Mizutani et al. | |
| 2003/0232558 A1 | 12/2003 | Moody, III et al. | |
| 2005/0177121 A1 | 8/2005 | Mizutani et al. | |
| 2008/0289157 A1 | 11/2008 | Higashinaka et al. | |

FOREIGN PATENT DOCUMENTS

| | | |
|---|---|---|
| DE | 4437165 A1 | 4/1996 |
| DE | 102005036759 A1 | 8/2006 |
| EP | 0903136 A2 | 3/1999 |
| EP | 0926287 A1 | 6/1999 |
| EP | 1201213 A2 | 5/2002 |
| JP | 02169718 A | 6/1990 |
| JP | 02-229255 A | 9/1990 |
| JP | 03-137257 | 6/1991 |
| JP | 08-060509 A | 3/1996 |
| JP | 08-216310 A | 8/1996 |
| JP | 2001-137284 A | 5/2001 |
| JP | 2002-030557 A | 1/2002 |
| JP | 2002-105835 A | 4/2002 |
| JP | 2002-136547 A | 5/2002 |
| JP | 2002-249965 A | 9/2002 |
| JP | 2003-126147 A | 5/2003 |
| JP | 2003126147 | 5/2003 |
| JP | 3587831 | 8/2004 |
| WO | 2005122817 A1 | 12/2005 |

OTHER PUBLICATIONS

European Search Report for Application No. EP07743982, mailed Apr. 8, 2010.

Office Action issued to U.S. Appl. No. 11/755,376, mailed Nov. 25, 2009.

Final Office Action issued to U.S. Appl. No. 11/748,712, mailed Mar. 23, 2010.

Office Action issued to CN Application No. 200780022784.6 mailed May 12, 2010.

Office Action issued to U.S. Appl. No. 11/762,421 mailed May 11, 2010.

Notice of Allowance Issued to U.S. Appl. No. 11/755,376, mailed Jun. 21, 2010.

Office Action Issued to U.S. Appl. No. 11/748,186, mailed Jun. 22, 2010.

Office Action issued Aug. 4, 2009, from U.S. Appl. No. 11/748,712, filed May 15, 2007.

* cited by examiner

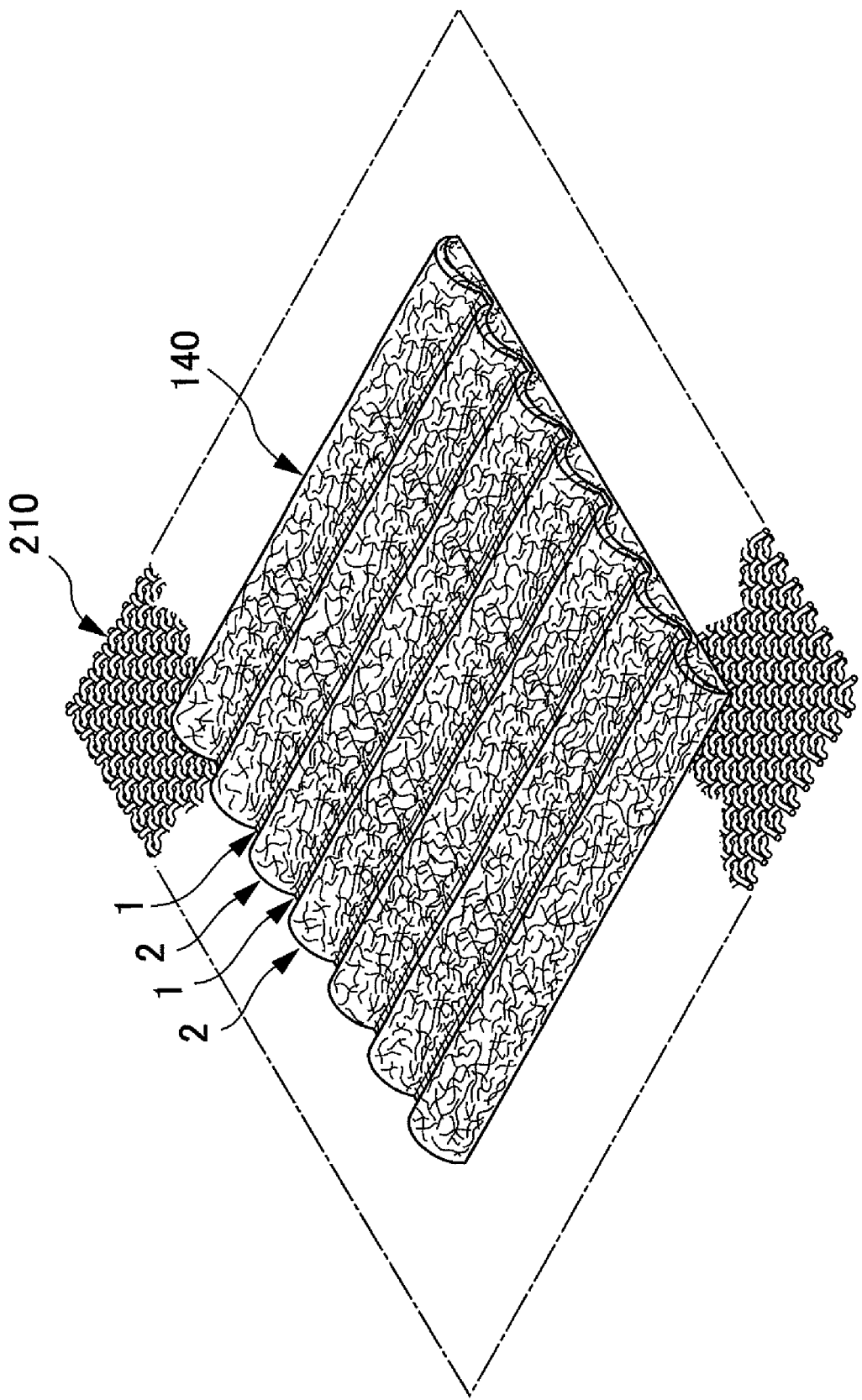

LONGITUDINAL DIRECTION

WIDTH DIRECTION

LONGITUDINAL DIRECTION

WIDTH DIRECTION

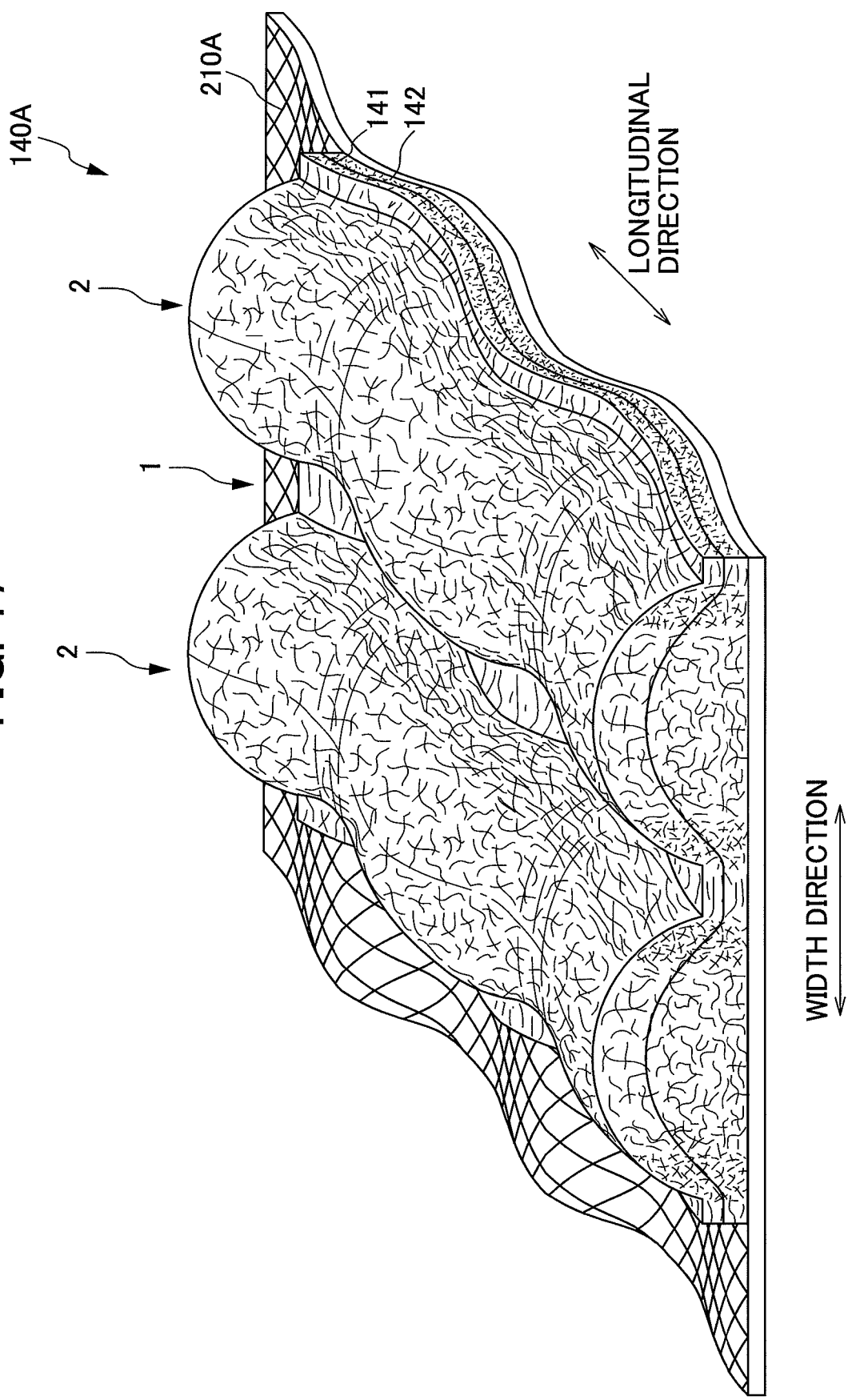

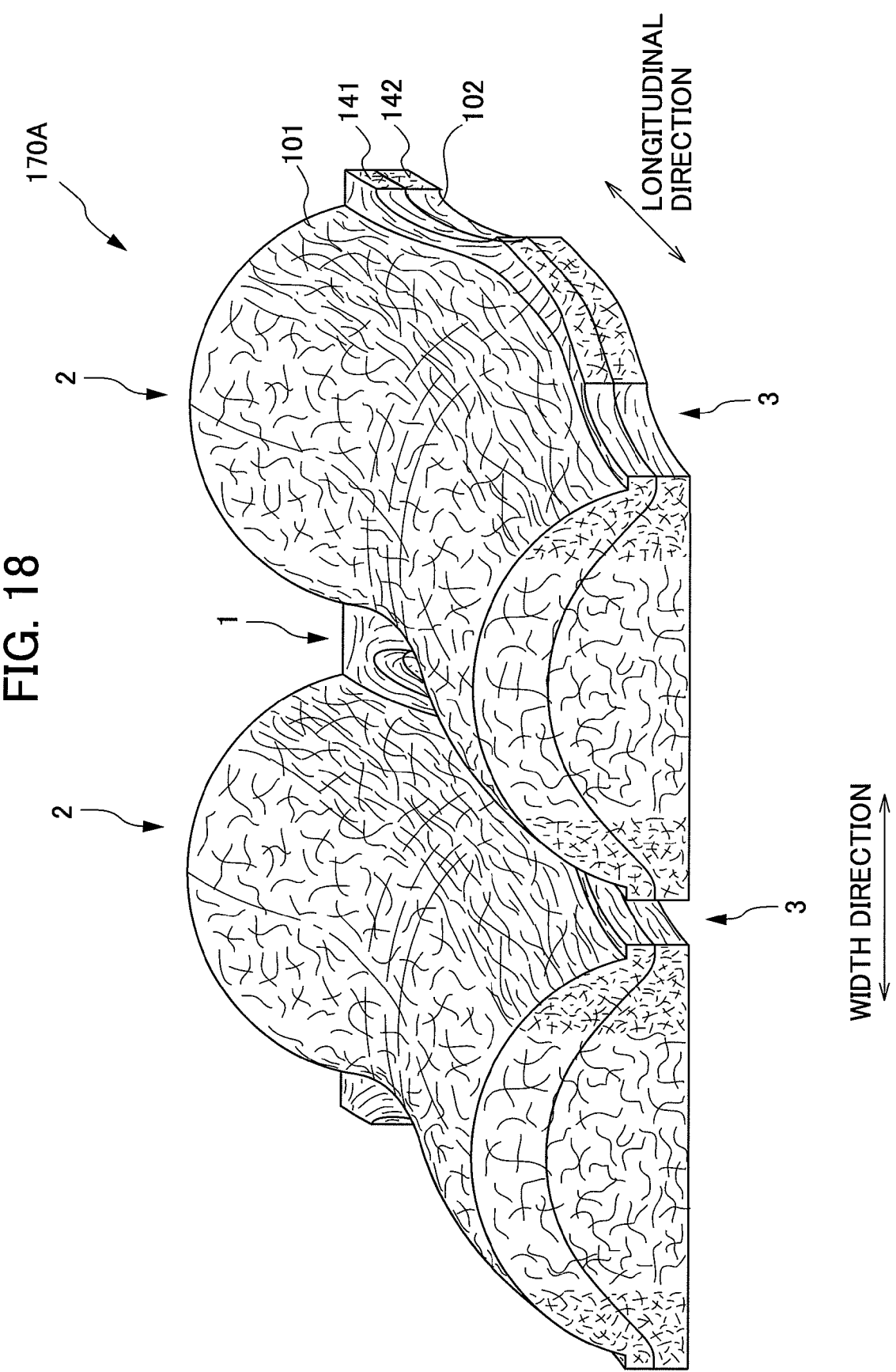

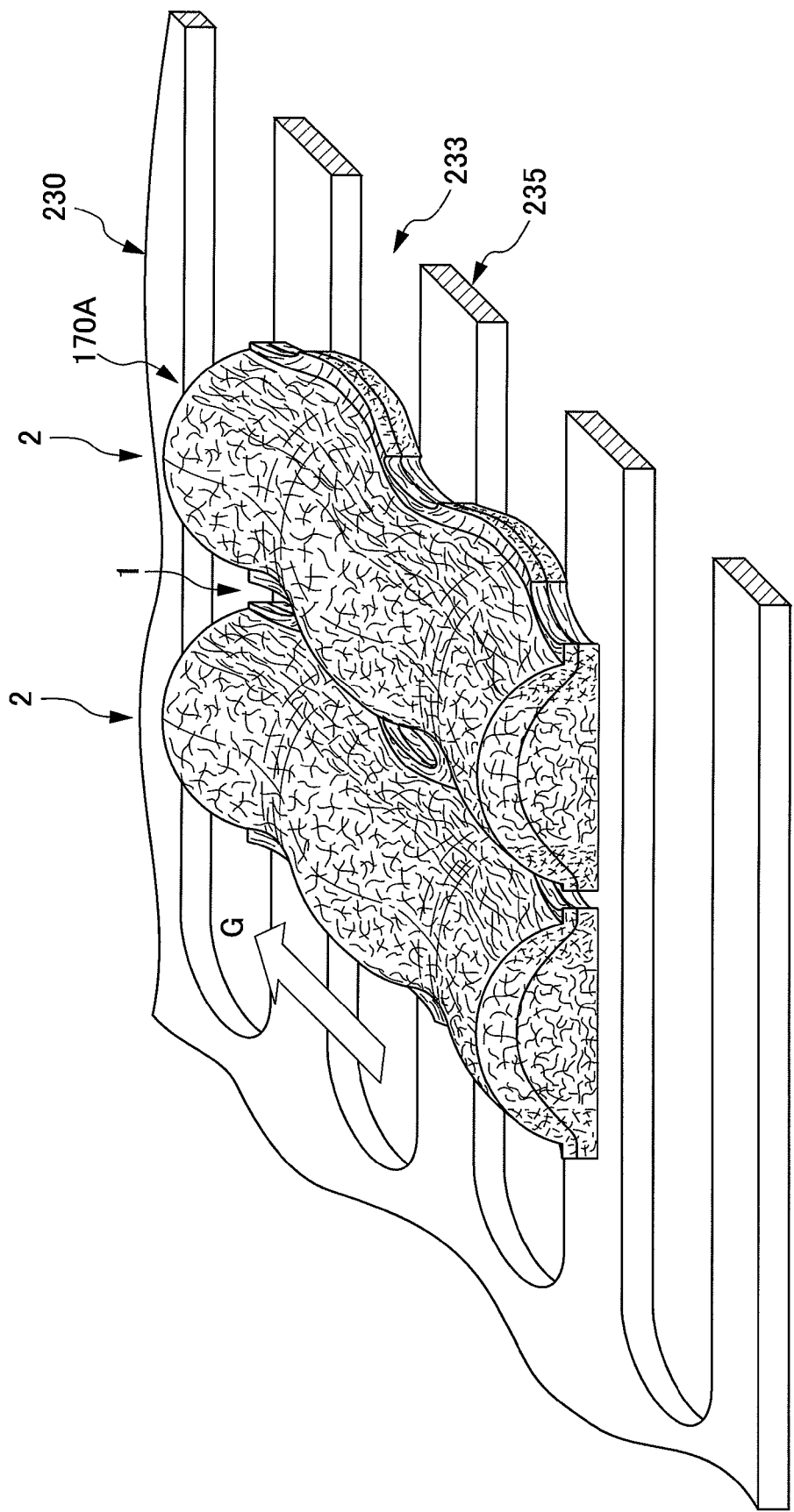

METHOD OF MANUFACTURING MULTILAYER NONWOVEN FABRIC

The present application is a divisional of U.S. application Ser. No. 11/762,421, filed Jun. 13, 2007, and claims priority from Japanese Application Number 2006-174505 filed Jun. 23, 2006, and Japanese Application Number 2006-270107, filed Sep. 29, 2006, the disclosures of which are hereby incorporated by reference herein in their entirety.

BACKGROUND OF THE INVENTION

1. Field of the Invention

The present invention relates to a multilayer nonwoven fabric including a plurality of layers.

2. Related Art

Nonwoven fabrics have been conventionally employed in a wide range of fields, for example, sanitary materials such as disposable diapers and sanitary napkins, cleaning supplies such as wipers, and medical supplies such as masks. The nonwoven fabrics have been thus employed in different fields. When the nonwoven fabrics are actually employed for products in various fields, however, they must be manufactured so as to have properties and structures suitable for respective applications of the products.

In recent years, demand for multilayer nonwoven fabrics designed so as to have desired functions by laminating a plurality of nonwoven fabrics has increased. It is required that the multilayer nonwoven fabrics are manufactured so as to have shapes and structures suitable for respective applications of the products.

On the other hand, Japanese Patent Publication No. 3587831, for example, proposes a multilayer nonwoven fabric, in which a plurality of raised ridge portions are formed on a first fiber layer, serving as a surface sheet used for a skin abutted surface of an absorbent article and manufactured by heating multilayer fibers obtained by laminating the first fiber layer and a second fiber layer including latent crimped fibers and partially thermally fusing the first fiber layer and the second fiber layer at a plurality of positions.

However, the multilayer nonwoven fabric is a multilayer nonwoven fabric manufactured by heating multilayer fibers obtained by laminating a first fiber layer and a second fiber layer containing latent crimped fibers and thermally fusing the first fiber layer and the second fiber layer at a plurality of positions. In the multilayer nonwoven fabric, the second fiber layer heat-shrinks so that slack occurs in the first fiber layer, to form a large number of raised ridge portions. The second fiber layer heat-shrinks in a horizontal direction (a plane direction) so that the size thereof is reduced while maintaining a sheet shape, while the above-mentioned slack in the first fiber layer constitutes the raised ridge portions. Here, the raised ridge portions are formed of only the first fiber layer. When the first fiber layer is composed of flexible fibers in the multilayer nonwoven fabric, however, the raised ridge portions may be easily crushed by the application of pressure or the like. That is, this multilayer nonwoven fabric is superior in original feeling. However, the raised ridge portions are easily crushed during use so that the ratio of contact with the skin may, in some cases, be increased. As a result, a user may experience a foreign-body sensation or excreta may more readily adhere to the user's skin.

SUMMARY OF THE INVENTION

An objective of the present invention is to provide a multilayer nonwoven fabric including a first fiber layer and a second fiber layer laminated and arranged on a first surface of the first fiber layer and adjusted such that the first fiber layer and the second fiber layer have predetermined shapes.

In a first aspect of the present invention a multilayer nonwoven fabric includes, a first fiber layer and a second fiber layer laminated and arranged on a first surface of the first fiber layer, in which a plurality of groove portions, is formed along a prescribed direction in a shape depressed in a thickness direction of the multilayer nonwoven fabric as viewed from a second surface of the first fiber layer, and a plurality of raised ridge portions, is formed adjacent to the plurality of groove portions in a shape projected in the thickness direction and in which the basis weight is greater than the basis weight in constituting the bottoms of the groove portions are formed, each of the regions constituting the bottoms of the plurality of groove portions and the plurality of raised ridge portions includes the first fiber layer and the second fiber layer as viewed from the thickness direction, and the second fiber layer constituting each of the plurality of raised ridge portions is in such a shape that a surface, on the side of the first fiber layer, of the second fiber layer is projected in the same direction as the direction in which the second surface of the first fiber layer is projected.

In a second aspect of the multilayer nonwoven fabric as described in the first aspect of the present invention, the second fiber layer constituting each of the groove portions is arranged in such a shape that the surface, on the side of the first fiber layer, of the second fiber layer is depressed in the same direction as the direction in which the second surface of the first fiber layer is depressed.

In a third aspect of the multilayer nonwoven fabric as described in any of the first to second aspects of the present invention, the fiber density in the region constituting the bottom of the groove portion is less than the fiber density in the raised ridge portions.

In a fourth aspect of the multilayer nonwoven fabric as described in any one of the first to third aspects of the present invention, a surface, on the side opposite to the first fiber layer constituting the raised ridge portion, of the second fiber layer constituting the raised ridge portion is projected in the same direction as the direction in which the second surface of the first fiber layer is projected.

In a fifth aspect of the multilayer nonwoven fabric as described in any one of the first to fourth aspects of the present invention, a third layer is further arranged on the surface, on the side opposite to the first fiber layer, of the second fiber layer.

In a sixth aspect of the multilayer nonwoven fabric as described in any one of the first to fifth aspects of the present invention, each of the plurality of groove portions includes a plurality of low basis weight portions spaced at a predetermined distance from each other and located at the bottom of the groove portion.

In a seventh aspect of the multilayer nonwoven fabric as described in any one of the first to sixth aspects of the present invention, in which each of the plurality of low basis weight portions has a region, the thickness of which is less than the average thickness of the groove portion, and a surface at the bottom of each of the plurality of groove portions that has a raised and recessed portion when viewed in the thickness direction along the direction in which the groove portion extends.

In an eighth aspect of the multilayer nonwoven fabric as described in any one of the sixth to seventh aspects of the present invention, at least a portion of the plurality of low basis weight portions are openings.

In a ninth aspect of the multilayer nonwoven fabric as described in any one of the first to eighth aspects of the present invention, at least a portion of the plurality of raised ridge portions are formed so as to extend in the prescribed direction, and rise and fall in a wave shape when viewed in the thickness direction.

In a tenth aspect of the multilayer nonwoven fabric as described in any one of the first to ninth aspects of the present invention, in which the first fiber layer is in a state where the degree of freedom of fibers composing the first fiber layer is greater than the average degree of freedom of fibers composing the multilayer nonwoven fabric; and the second fiber layer is in a state where the degree of freedom of fibers composing the second layer is less than the average degree of freedom of fibers composing the multilayer nonwoven fabric.

In an eleventh aspect of the multilayer nonwoven fabric as described in the tenth aspect of the present invention, in at least the first fiber layer, intersections of a portion of the fibers composing the first fiber layer are adjusted in order to at least one of which being reduced joining strength and not being joined mutually.

In a twelfth aspect of the multilayer nonwoven fabric as described in any one of the tenth to eleventh aspects of the present invention, at least the second fiber layer contains fibers in the form of a three-dimensional crimped shape.

In a thirteenth aspect of the multilayer nonwoven fabric as described in any on of the tenth to twelfth aspects of the present invention, in at least the second fiber layer, the average fiber length of the fibers composing the second fiber layer is less than the average fiber length of the fibers composing the first fiber layer.

In a fourteenth aspect of the multilayer nonwoven fabric as described in any one of the tenth to thirteenth aspects of the present invention, in at least the second fiber layer, the average Young's modulus of the fibers composing the second fiber layer is greater than the average Young's modulus of the fibers composing the first fiber layer.

In a fifteenth aspect of the multilayer nonwoven fabric as described in the fourteenth aspect of the present invention, in at least the second fiber layer, the average fineness of the fibers composing the second fiber layer is greater than the average fineness of the fibers composing the first fiber layer.

In a sixteenth aspect of the multilayer nonwoven fabric as described in any one of the fourteenth to fifteenth aspects of the present invention, in at least the second fiber layer, the average content of inorganic matter in the fibers composing the second fiber layer is less than the average content of inorganic matter in the fibers composing the first fiber layer.

In a seventeenth aspect of the multilayer nonwoven fabric as described in any one of the fourteenth to sixteenth aspects of the present invention, at least the second fiber layer is composed of conjugate fibers, the conjugate fibers have cores and sheaths, the sheaths covering at least a portion of the cores, and are composed of an element having a melting point that is less than that of the cores, and the content of inorganic matter in the sheaths is greater than the content of inorganic matter in the cores.

In an eighteenth aspect of the multilayer nonwoven fabric as described in any one of the fourteenth to seventeenth aspects of the present invention, the first fiber layer and the second fiber layer are composed of conjugate fibers, the conjugate fibers have cores and sheaths, the sheaths covering at least a portion of the cores and are composed of an element having a melting point that is less than that of the cores, and the ratio of the mass of the cores to the mass of the fibers composing the second fiber layer is greater than the ratio of the mass of the cores to the mass of the fibers composing the first fiber layer.

In a nineteenth aspect of the multilayer nonwoven fabric as described in any one of the fourteenth to eighteenth aspects of the present invention, the second fiber layer is formed by an airlaid process.

In a twentieth aspect of the multilayer nonwoven fabric as described in any one of the first to nineteenth aspects of the present invention, the multilayer nonwoven fabric is a through-air nonwoven fabric.

In a twenty first aspect of the multilayer nonwoven fabric as described in any one of the first to twentieth aspects of the present invention, at least the first fiber layer includes a portion of water-repellent fibers, and a hydrophilic gradient directed toward the second fiber layer from the first fiber layer exists.

In a twenty second aspect of the present invention a method of manufacturing a multilayer nonwoven fabric, comprising a supporting step of arranging on a predetermined surface of a permeable supporting member a multilayer fiber aggregate having a first fiber aggregate formed in a sheet shape and being in a state where fibers composing the fiber aggregate have a degree of freedom, and a second fiber aggregate formed in a sheet like shape laminated and arranged on a first surface of the first fiber aggregate and being in a state where fibers composing the fiber aggregate have a degree of freedom, to support the multilayer fiber aggregate from the first surface on the permeable supporting member, a moving step of moving the multilayer fiber aggregate supported on the permeable supporting member in a prescribed direction by a predetermined moving means, and a spraying step of spraying a fluid mainly composed of gas on the multilayer fiber aggregate moved in the prescribed direction in the moving step from the second surface thereof by a predetermined spraying means.

In a twenty third aspect of the method as described in the twenty second aspect of the present invention, the permeable supporting member in the supporting step comprises a permeable portion that the fluid mainly composed of gas sprayed onto the multilayer fiber aggregate permeates to a side opposite to the side on which the multilayer fiber aggregate is disposed, and an impermeable portion that the fluid mainly composed of gas sprayed on the multilayer fiber aggregate cannot permeate to the side opposite to the side on which the multilayer fiber aggregate is disposed and through which the fibers composing the multilayer fiber aggregate cannot be displaced. In the spraying step, the fluid mainly composed of gas is sprayed on a region of the multilayer fiber aggregate, supported on the permeable portion in the permeable supporting member, to form predetermined groove portions.

In a twenty fourth aspect of the method as described in any one of the twenty second to twenty third aspects of the present invention, in the spraying step, the fluid mainly composed of gas is sprayed on a region, supported on the impermeable portion of the permeable supporting member, in the multilayer fiber aggregate, to form a predetermined low basis weight portion.

In a twenty fifth aspect of the method as described in the twenty fourth aspect of the present invention, in the spraying step, the fibers composing the multilayer fiber aggregate are displaced by the fluid mainly composed of gas, to be sprayed and the fluid mainly composed of gas to be sprayed, of which the direction of flow has been modified by the impermeable portion after permeating the multilayer fiber aggregate.

In a twenty sixth aspect of the method as described in any one of the twenty fourth to twenty fifth aspects of the present invention, the low basis weight portion is an opening.

The present invention provides a multilayer nonwoven fabric comprising a first fiber layer and a second fiber layer laminated and arranged on a first surface of the first fiber layer and adjusted such that the first fiber layer and the second fiber layer respectively have predetermined shapes.

BRIEF DESCRIPTION OF THE DRAWINGS

FIG. 5 is a diagram showing a state where gas is sprayed on an upper surface of the multilayer fiber web shown in FIG. 1 with a lower surface of the multilayer fiber web supported on the mesh-shaped supporting member shown in FIG. 4A, to manufacture the multilayer nonwoven fabric shown in FIG. 2;

FIG. 17 is a diagram showing a state where gas is sprayed on an upper surface of a two-layer fiber web with a lower surface of the two-layer fiber web supported on the mesh-shaped supporting member shown in FIG. 16, to manufacture a multilayer nonwoven fabric according to a fifth embodiment;

FIG. 18 is a perspective sectional view of a multilayer nonwoven fabric according to a sixth embodiment;

FIG. 20 is a diagram showing a state where gas is sprayed on an upper surface of a two-layer fiber web with a lower surface of the two-layer fiber web supported on the plate-shaped supporting member shown in FIG. 19A or 19B, to manufacture a multilayer nonwoven fabric according to a sixth embodiment;

DETAILED DESCRIPTION OF THE INVENTION

Figure 1:
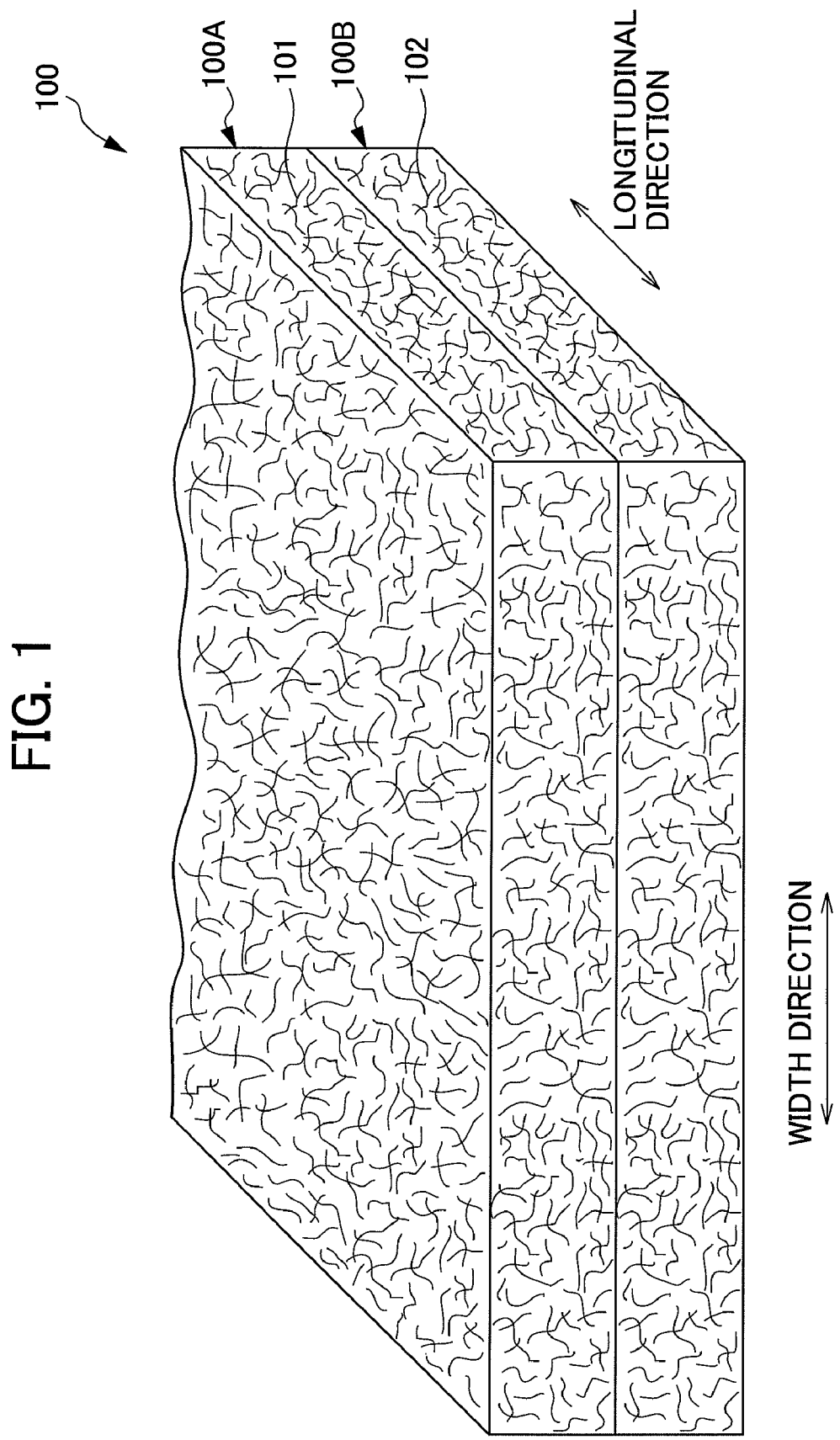
FIG. 1 is a perspective view of a multilayer fiber web.

Referring now to the drawings, a best mode for carrying out the present invention will be described.

1. First Embodiment 1-1. Outline

A multilayer nonwoven fabric 140 in a first embodiment will be described with reference to FIG. 2 to FIG. 9. The multilayer nonwoven fabric 140 in the first embodiment comprises a first fiber layer 141 and a second fiber layer 142 laminated and arranged on a first surface of the first fiber layer 141. A plurality of groove portions 1 is formed along a longitudinal direction or machine direction (MD), serving as a prescribed direction, in a shape depressed in a thickness direction of the multilayer nonwoven fabric 140 as viewed from the second surface of the first fiber layer 141, and a plurality of raised ridge portions 2 is formed adjacent to the plurality of groove portions 1 in a shape projected in the thickness direction and in which the basis weight is greater than the basis weight at the respective bottoms of the groove portions 1 are formed. As viewed from the thickness direction, each of the regions respectively constituting the bottoms of the plurality of groove portions 1 and the plurality of raised ridge portions 2 comprises the first fiber layer 141 and the second fiber layer 142. The second fiber layer 142 constituting each of the plurality of raised ridge portions 2 is in such a shape that its surface on the side of the first fiber layer 141 is projected in the same direction as the direction in which the second surface of the first fiber layer 141 is projected. Further, the second fiber layer 142 in the groove portion 1 is in such a shape that its surface on the side of the first fiber layer 141 is depressed in the same direction as the direction in which the second surface of the first fiber layer 141 is depressed.

Figure 2:
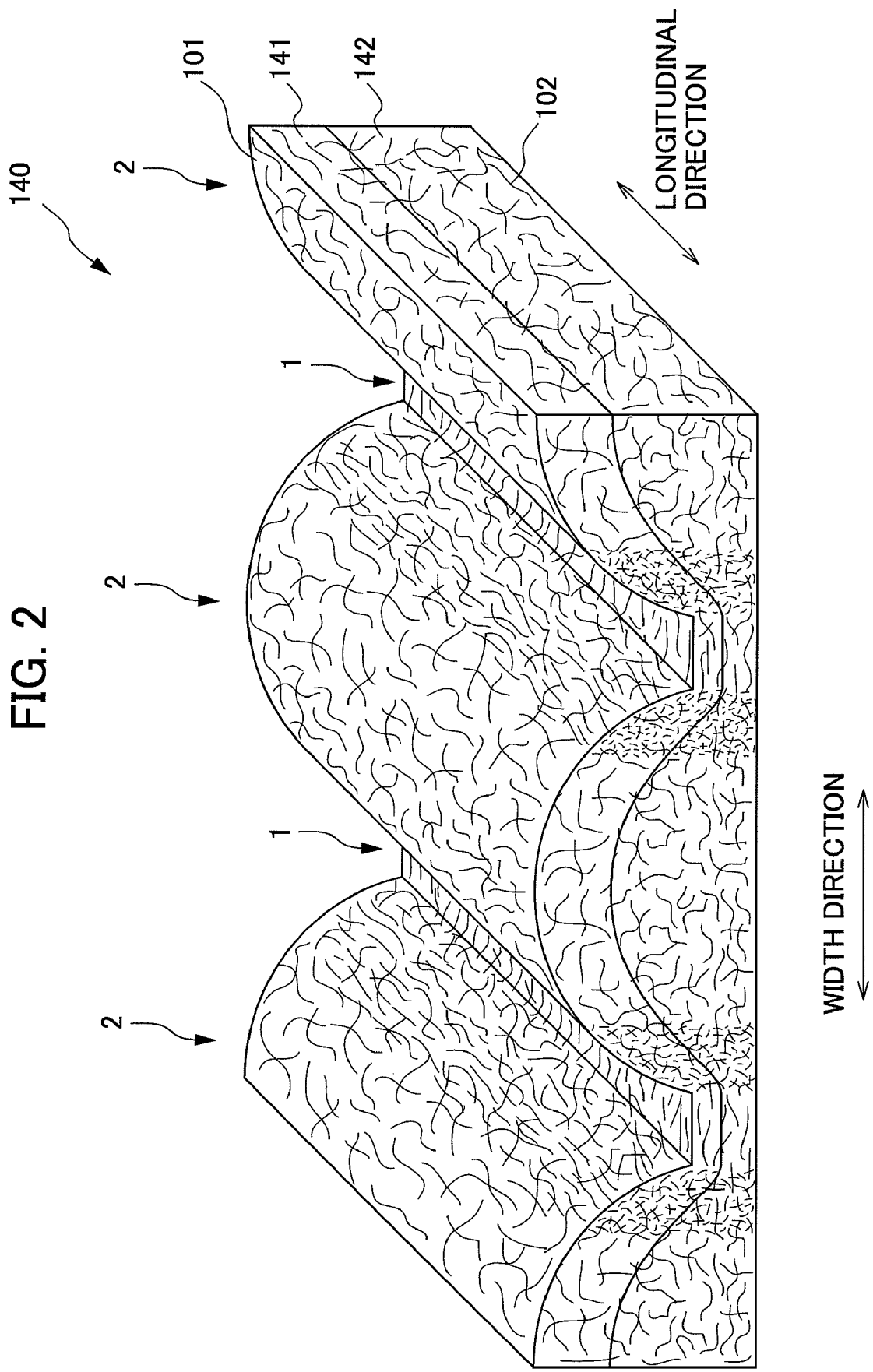
FIG. 2 is a perspective sectional view of a multilayer nonwoven fabric according to a first embodiment.
Figure 3A:
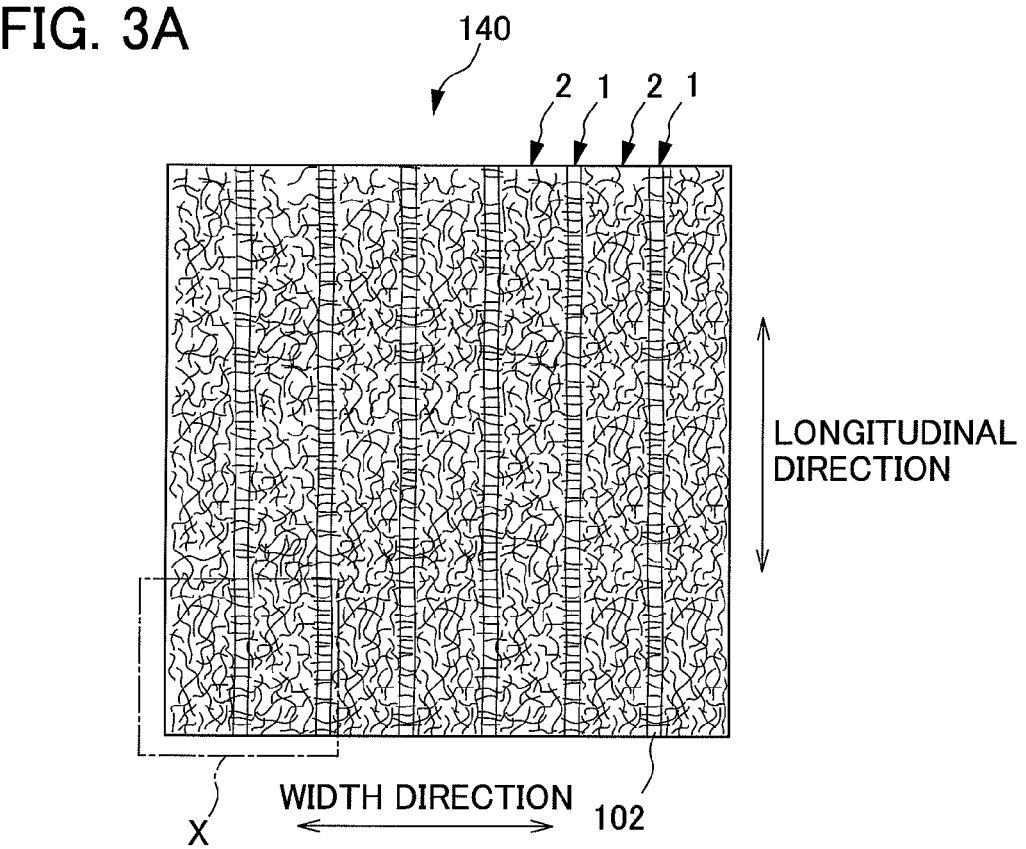
FIG. 3A is a plan view of a multilayer nonwoven fabric according to a first embodiment.
Figure 3B:
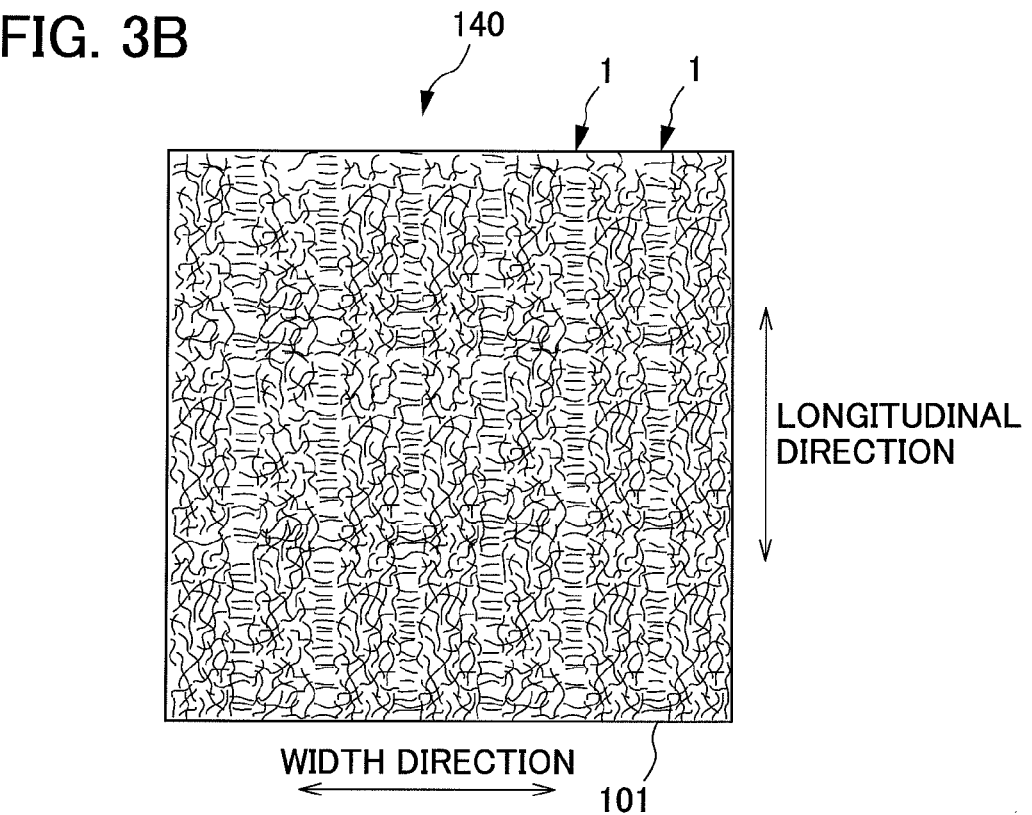
FIG. 3B is a bottom view of a multilayer nonwoven fabric according to a first embodiment.

Here, although the groove portions 1 are almost equally spaced in a parallel manner as viewed from the width direction (cross direction (CD)) perpendicular to the longitudinal direction (machine direction (MD)) in the multilayer nonwoven fabric 140 shown in FIG. 2, the present invention is not limited to the same. For example, the groove portions 1 may be differently spaced. Alternatively, the groove portions 1 may be formed not in a parallel manner but such that the spacing therebetween is changed as viewed from the MD. The heights (the thicknesses) of the plurality of raised ridge portions 2 may be not uniform but different from one another.

1-2. Shape

As shown in FIG. 2, the multilayer nonwoven fabric 140 in the present embodiment has the first fiber layer 141 and the second fiber layer 142 laminated and arranged therein, as described above. The multilayer nonwoven fabric 140 has the plurality of groove portions 1 almost equally spaced in a parallel manner on the side of the first surface and specifically on the side of the first fiber layer 141, as described above. The plurality of raised ridge portions 2 are respectively formed among the plurality of groove portions 1 almost equally spaced. The raised ridge portions 2 are almost equally spaced in a parallel manner, similarly to the groove portions 1.

Here, although the groove portions 1 are almost equally spaced in a parallel manner as viewed from the CD in the present embodiment, the present invention is not limited to the same. For example, the groove portions 1 may be differently spaced. Alternatively, the groove portions 1 may be formed not in a parallel manner, but such that the spacing therebetween is changed as viewed from the MD, as described above.

Each of the regions constituting the bottoms of the plurality of groove portions 1 and the plurality of raised ridge portions 2 has the first fiber layer 141 and the second fiber layer 142 laminated and arranged therein. Here, the second fiber layer 142 in the multilayer nonwoven fabric 140 is not merely in a sheet shape having a uniform thickness but in a shape corresponding to the shape of the plurality of groove portions 1, or the like, formed on the side of the first fiber layer 141.

In the raised ridge portion 2, the surface, on the side opposite to the side on which the second fiber layer 142 is arranged, of the first fiber layer 141 constitutes a surface of the raised ridge portion 2. This surface is projected in a U shape outward (upward in the figure) in the thickness direction of the multilayer nonwoven fabric 140. The surface, on the side of the second fiber layer 142, of the first fiber layer 141 is in a shape projected in a U shape in the same direction as the direction in which the surface, constituting the surface of the raised ridge portion 2, of the first fiber layer 141 is projected.

A surface (bottom surface), on the side opposite to the first fiber layer 141, of the second fiber layer 142 and constituting the second surface of the multilayer nonwoven fabric 140 is formed in a plane shape. The surface, on the side of the first fiber layer 141, of the second fiber layer 142 is deformed in a projected shape along the surface, on the side of the second fiber layer 142, of the first fiber layer 141. That is, the surface, on the side of the first fiber layer 141, of the second fiber layer 142 is projected in the same direction as the direction in which the surface of the first fiber layer 141 is projected in a U shape.

The thickness of the first fiber layer 141 in the region constituting the bottom of the groove portion 1 is less than the thickness of the first fiber layer 141 in the raised ridge portion 2. Further, the thickness of the first fiber layer 141 in the raised ridge portion 2 is less than the thickness of the second fiber layer 142.

A surface, on the side of the surface of the first fiber layer 141, of the groove portion 1 is in a shape depressed so as to decrease in the thickness of the first fiber layer 141 in the thickness direction. Further, a surface, on the side of the first fiber layer 141, of the second fiber layer 142 is in a shape depressed in the same direction as the direction in which the surface of the first fiber layer 141 is depressed.

Although the heights (the thicknesses) of the raised ridge portions 2 in the multilayer nonwoven fabric 140 in the present embodiment are substantially uniform, the heights of the adjacent raised ridge portions 2 may differ from each other, for example. For example, the height of the raised ridge portion 2 can be adjusted by adjusting the spacing between spray ports 913, described later, from which a fluid mainly composed of gas is sprayed. For example, the height of the raised ridge portion 2 can be reduced by narrowing the spacing between the spray ports 913. Conversely, the height of the raised ridge portion 2 can be increased by widening the spacing between the spray ports 913. Further, the raised ridge portions 2 respectively having different heights can be also alternately formed by forming the spacing between the spray ports 913 so as to alternate between the narrow spacing and the wide spacing. When the multilayer nonwoven fabric having the raised ridge portions 2 with different heights alternately formed therein, comes into contact with the body, the region of contact with the skin is reduced when compared to a situation where the heights of the raised ridge portions 2 are uniform, this reduces the burden on the skin.

Here, it is preferable that the height of the raised ridge portion 2 is 0.3 to 15 mm, and particularly 0.5 to 5 mm. Further, it is preferable that the width of the raised ridge portion 2 is 0.5 to 30 mm, and particularly 1.0 to 10 mm. It is preferable that the pitch between the vertexes of the adjacent raised ridge portions 2 is 0.5 to 30 mm, and particularly 3 to 10 mm.

It is preferable that the height (the length in the thickness direction) of the second fiber layer 142 in the raised ridge portion 2 is not greater than 95%, particularly 20 to 90%, and further 40 to 70% of the height of the raised ridge portion 2. Here, the height (the length in the thickness direction) of the second fiber layer 142 in the raised ridge portion 2 is made to be greater than the height of the region constituting the bottom of the groove portion 1.

It is preferable that the height (the thickness) of the region constituting the bottom of the groove portion 1 is not greater than 90%, particularly 1 to 50%, and further 5 to 20% of the height of the raised ridge portion 2. It is preferable that the width of the groove portion 1 is 0.1 to 30 mm, and particularly 0.5 to 10 mm. It is preferable that the spacing between the adjacent groove portions 1 is 0.5 to 20 mm, and particularly 3 to 10 mm. It is preferable that the height of the second fiber layer (inner layer) 142 in the region constituting the bottom of the groove portion 1 is not greater than 95%, particularly 20 to 90%, and further 40 to 70% of the height (the length in the thickness direction) of the region constituting the bottom of the groove portion 1.

Here, methods of measuring the height, the pitch, the width, and so on in the raised ridge portion 2 and the region constituting the bottom of the groove portion 1 are exemplified below. For example, the multilayer nonwoven fabric 140 is installed in a pressureless state on a table, a cross section of the multilayer nonwoven fabric 140 is photographed with a microscope, and the multilayer nonwoven fabric is measured from a picture or an image of the cross section. The multilayer nonwoven fabric 140 serving as an object to be measured is cut along the width direction (CD) so as to pass through the vertex of the raised ridge portion 2 and the groove portion 1.

When the height (the length in the thickness direction) is measured, the uppermost position of each of the raised ridge portion 2 and the region constituting the bottom of the groove portion 1 that are directed upward from the lowermost position of the multilayer nonwoven fabric 140 (i.e., a surface of the table) is measured as the height.

When the pitch is measured, the distance between the vertexes serving as the uppermost positions of the adjacent raised ridge portions 2 is measured as the pitch between the raised ridge portions 2, and the distance between the centers serving as central positions of the adjacent groove portions 1 is measured as the pitch between the groove portions 1.

When the width is measured, the maximum width of a bottom surface of the raised ridge portion 2 directed upward from the lowermost position of the multilayer nonwoven fabric 140 (i.e., the surface of the table) is measured, and the maximum width of a bottom surface of the groove portion 1 is similarly measured.

Here, examples of the cross-sectional shape of the raised ridge portion 2 include, but are not particularly limited to, a dome shape, a trapezoidal shape, a triangular shape, a Ω shape, and a square shape. When the multilayer nonwoven fabric 140 is used as a surface sheet in an absorbent article or the like, for example, it is preferable that the shape of each of a top surface and a side surface of the raised ridge portion 2 is a curved (curved surface) shape in consideration of feel against the skin of a wearer. In order to inhibit the raised ridge portion 2 from being crushed by pressure or the like, and therefore reducing space formed by the groove portion 1 from being crushed, it is preferable that the raised ridge portion 2 narrows toward the top surface thereof from the bottom surface of the groove portion 1. A case where the cross-sectional shape is the dome shape can be taken as a preferable example.

The cross section of the second fiber layer (inner layer) 142 in the raised ridge portion 2 can be formed in a predetermined shape, as described above. In order to make it difficult to convey a stiffness feeling of the second fiber layer 142 to the wearer, preferable examples of the shape thereof includes, but are not particularly limited to, a curved (curved surface) shape such as a dome shape.

Furthermore, the raised ridge portion 2 can be made difficult to crush in the thickness direction by being formed of hard fibers (fibers that are difficult to crush).

Fibers 101 composing the first fiber layer 141 can be made to have a degree of freedom that is greater than the average degree of freedom of fibers composing the multilayer nonwoven fabric 140, and can be made to have a degree of freedom less than the average degree of freedom of fibers 102 composing the second fiber layer 142. For example, the degree of freedom of the fibers 102 composing the second fiber layer 142 can be adjusted so as to be greater than the degree of freedom of the fibers 101 composing the first fiber layer 141. Here, the average degree of freedom of fibers means an average of the degrees of freedom of the fibers 101 composing the first fiber layer 141 and the fibers 102 composing the second fiber layer 142, for example.

In order to make the degree of freedom of the fibers 101 composing the first fiber layer 141 high, the respective strengths of the fibers 101 at their intersections are made to partially differ, for example. Specifically, all or some of the fibers 101 composing the first fiber layer 141 at the intersections can be adjusted so as to respectively have reduced joining strengths or so as not to be joined mutually.

In order to adjust all or some of the fibers 101 composing the first fiber layer 141 at the intersections so as to respectively have reduced joining strengths or so as not to be joined together, a plurality of types of fibers that differ in melting points of resin components on their surfaces can be mixed. For example, it is possible to configure a fiber aggregate by mixing fibers A serving as a core-sheath structure of low-density polyethylene (a melting point of 110 degrees C.) and polyethylene terephthalate and fibers B serving as a core-sheath structure of high-density polyethylene (a melting point of 135 degrees C.) and polyethylene terephthalate in a ratio of 70:30. Consider a case where the fiber aggregate is subjected to heat treatment at a temperature of 120 degrees C. by an oven or the like. In this case, at an intersection of the fibers A and an intersection of the fiber A and the fiber B in the fiber aggregate, the fibers are thermally fused by the molten low-density polyethylene. Here, the amount of the molten low-density polyethylene at the intersection is large. Thus, the fusion strength at the intersection of the fibers A is greater than the fusion strength at the intersection of the fiber A and the fiber B. Further, at an intersection of the fibers B, the fibers are not thermally fused because the high-density polyethylene does not melt. That is, the fibers are thermally fused, for example, the relationship between the fusion strength of the fibers can be stated as, the strength at the intersection of the fibers A >(is greater than) the strength at the intersection of the fiber A and the fiber B>(which is greater than) the strength at the intersection of the fibers B. In this case, the second fiber layer 142 is formed of fibers having a melting point of not greater than 120 degrees C., for example, which allows the fusion strength of the intersection of the fibers 102 composing the second fiber layer 142 to be greater than the fusion strength of the intersection of the fibers 101 composing the first fiber layer 141.

Here, a method of calculating "average" in "average fiber length", "average Young's modulus", "average fineness", and "average content of inorganic matter" will be shown. When the mixture ratio of the fibers A and the fibers B in the first fiber layer 141 is 70:30, and the fiber lengths of the fibers A and the fibers B are respectively 51 mm and 45 mm, the average fiber length of the first fiber layer 141 is (0.7×51 mm)+(0.3×45 mm)=49.2 mm, so that "average" can be calculated from a fiber component ratio.

Fibers having a larger length than the average fiber length of the multilayer nonwoven fabric 140 can be used as the fibers 101 composing the first fiber layer 141. Further, fibers having a greater length than the length of the fibers 102 composing the second fiber layer 142 can be used as the fibers 101 composing the first fiber layer 141. The greater the fiber length, the greater the distance between fibers is possible. Therefore, the fibers do not easily come into contact with one another, so that the degree of freedom of the fibers is high.

Fibers having a length that is less than the average fiber length of the multilayer nonwoven fabric 140 can be used as the fibers 102 composing the second fiber layer 142. Further, fibers having a length that is less than the length of the fibers 101 composing the first fiber layer 141 can be used as the fibers 102 composing the second fiber layer 142. The lower the fiber length, the less distance between fibers is possible. Therefore, the density of the fibers can be increased. This allows a density gradient in the raised ridge portion 2. Even if a small amount of liquid such as menstrual blood or sweat adheres to the top of the raised ridge portion 2, therefore, the liquid can be suitably moved to the second fiber layer 142.

In order to reduce the degree of freedom of the fibers 102 composing the second fiber layer 142, the second fiber layer 142 can contain fibers in a three-dimensional crimped shape, for example. Examples of the three-dimensional crimped shape include a spiral shape, a zigzag shape, and a Ω shape. In a case where the fibers are mixed so as to be wholly oriented in a plane direction, while being partially oriented in the thickness direction, the buckling strength of the fibers themselves is exerted in the thickness direction. Therefore, the second fiber layer 142 is difficult to crush even if external pressure is applied thereto.

Furthermore, it is preferable that the three-dimensional crimped shape is a spiral shape because the second fiber layer 142 attempts to return to its original shape when pressure is released from a pressurized state, for example. Even if the second fiber layer 142 is slightly crushed by excess external pressure, therefore, it easily returns to its original thickness after the external pressure is released.

Examples of a method of providing the fibers with the three-dimensional crimped shape include a method of giving a shape by machine crimping and a method of giving a shape by heat shrinkage. As the machine crimping, the crimped shape is given to linear fibers continuously after spinning while adjusting a peripheral speed difference between line speeds, heat, and pressurization conditions. The greater the number of crimps per unit length of the crimped fibers, the greater the buckling strength of the fibers under external pressure. Specifically, the number of crimps is selected from a range of 10 to 35 pcs/inch, and further a range of 15 to 30 pcs/inch.

As the heat shrinkage, heat is applied to fibers composed of two or more resins that differ in melting points to give the crimped shape, for example. Specifically, fibers designed so as to differ in heat shrinkage percentages depending on a difference in melting points are heated, to develop three-dimensional crimps due to the difference in heat shrinkage percentages. Examples of a resin structure as viewed from the cross section of the fibers include respective core-sheath structures of an eccentric core-sheath type and a side-by-side type in which right and left components differ in melting points. It is preferable that the heat shrinkage percentages of such fibers are in a range of 5 to 90%, and further a range of 10 to 80%.

Here, a method of measuring the heat shrinkage percentage is as follows: (1) 200 g/m2 of a fiber web is produced by 100% fibers to be measured, (2) the fiber web is cut to a size of 250 mm by 250 mm, (3) a sample obtained by the cutting is subjected to heat treatment with the sample left within an oven with a temperature of 145 degrees C. for five minutes, (4) the length of the sample that has heat-shrunk by the heat treatment is measured, and (5) the heat shrinkage percentage is calculated from a difference between the lengths before and after the heat shrinkage.

It is preferable that the content of the fibers in the three-dimensional crimped shape in the second fiber layer 142 is not less than 30% by mass, and particularly not less than 50% by mass, for example. It is preferable that the content of the fibers in the three-dimensional crimped shape is not less than 30% by mass because compression maintenance properties and compression recovery properties are easily obtained in the second fiber layer 142.

Here, the first fiber layer 141 can similarly contain fibers in a three-dimensional crimped shape. It is preferable that the content of the fibers in the three-dimensional crimped shape in the first fiber layer 141 is not more than 70% by mass, and particularly not more than 50% by mass, for example. The fibers in the three-dimensional crimped shape are contained as the fibers 101 composing the first fiber layer 141 so that the fiber density in the first fiber layer 141 can be reduced. This is preferable because good transitional properties of a liquid from the first fiber layer 141 to the second fiber layer 142 is obtained. Further, a foreign-body sensation caused by an end surface (a cut edge) of the fibers in the three-dimensional crimped shape touching the skin can be restrained by setting the content of the fibers in the three-dimensional crimped shape in the first fiber layer 141 to be not greater than 70% by mass.

Fibers 102 composing the second fiber layer 142 are fibers having a higher Young's modulus than the fibers 101 composing the first fiber layer 141. In other words, the average Young's modulus of the fibers 102 composing the second fiber layer 142 can be adjusted so as to be greater than the average Young's modulus of the fibers 101 composing the first fiber layer 141.

In this situation fibers having a high Young's modulus used as the fibers 102 composing the second fiber layer 142 are fibers having a high fineness. Examples include fibers having a greater fineness than the fineness of the fibers 101 composing the first fiber layer 141.

Furthermore, fibers 102 composing the second fiber layer 142 are fibers having a low content of inorganic matter. Examples include fibers having a lower content of inorganic matter than that of the fibers 101 composing the first fiber layer 141. Examples of the inorganic matter include an inorganic filler such as titanium oxide. Examples of fibers having a Young's modulus that is not easily reduced even if they contain inorganic matter and obtaining whitening properties include conjugate fibers that have cores and sheaths covering all or some of the cores as well as composed of a component having a lower melting point than that of the cores and in which the content of inorganic matter in the sheaths is greater than the content of inorganic matter in the cores. Even if the content of the inorganic matter included in the fibers 101 composing the first fiber layer 141 and the content of the inorganic matter included in the fibers 102 composing the second fiber layer 142 are equal to each other, for example, the fibers 102 composing the second fiber layer 142 are fibers in which the content of inorganic matter in sheaths is greater than the content of inorganic matter in cores.

Fibers 102 composing the second fiber layer 142 are fibers in which the ratio of the mass of cores to the mass of fibers composing a second fiber layer is greater than the ratio of the mass of cores to the mass of fibers composing a first fiber layer. That is, in a so-called core-sheath mass ratio, the mass of the cores in the fibers used for the second fiber layer is greater. The use of such fibers allows fiber rigidity to be maintained because the mass ratio of the cores is high even after thermal fusion.

The second fiber layer 142 can be formed by an airlaid process using fibers having a fiber length that is less than that of the fibers composing the first fiber layer 141. When the fibers 102 having a small fiber length are laminated to a predetermined thickness, to form the second fiber layer 142, the second fiber layer 142 can be suitably formed by the airlaid process.

It is preferable that fibers having a small fiber length are laminated by an airlaid process for the following reason. That is, the fibers are easily oriented in a thickness direction of a fiber layer. Since a liquid such as menstrual blood is easily moved along the fiber orientation, it is possible to inhibit the liquid such as menstrual blood that has been moved to the second fiber layer (inner layer) 142 from diffusing in a plane direction on the surface of the multilayer nonwoven fabric 140 when the second fiber layer 142 is laminated and formed by the airlaid process to be adjusted such that the fibers are oriented in the thickness direction, for example. Further, the fibers composing the second fiber layer 142 are oriented in the thickness direction, so that the buckling strength of the fibers is improved. Therefore, the raised ridge portion is not easily crushed even when external pressure is applied thereto.

1-3. Fiber Orientation, Fiber Density, and Basis Weight 1-3-1. Fiber Orientation As shown in FIG. 2, the fibers 101 arranged in the region constituting the bottom of the groove portion 1 are oriented in a direction intersecting the longitudinal direction and specifically, in the width direction of the groove portion 1. The fibers 101 in the first fiber layer 141 and the fibers 102 in the second fiber layer 142 are wholly oriented in the width direction (cross direction (CD)). Here, the orientation of the fibers 101 in the first fiber layer 141 and the orientation of the fibers 102 in the second fiber layer 142 can be respectively adjusted by adjusting the respective degrees of freedom, properties, and so on of the fibers 101 composing the first fiber layer 141 and the fibers 102 composing the second fiber layer 142 and adjusting the strength of gas to be sprayed. For example, the ratio of the fibers 101 oriented in the cross direction in the first fiber layer 141 and the ratio of the fibers 102 oriented in the cross direction in the second fiber layer 142 can be also adjusted so as to differ from each other.

The fibers in side parts of the raised ridge portion 2 are oriented along the longitudinal direction of the raised ridge portion 2. For example, the fibers are oriented in the longitudinal direction (machine direction MD), as compared with the fibers oriented at the center (in a region between both the side parts) of the raised ridge portion 2 as viewed from the width direction.

1-3-2. Fiber Density

As shown in FIG. 2, the region constituting the bottom of the groove portion 1 is adjusted such that the fiber density therein is less than the fiber density in the raised ridge portion 2. The fiber density in the region constituting the bottom of the groove portion 1 can be arbitrarily adjusted by various conditions such as the amount of a fluid mainly composed of gas (e.g., hot air) and tension.

Furthermore, the fiber density in the side parts of the raised ridge portion 2 as viewed from the width direction can be arbitrarily adjusted by various conditions such as the amount of a fluid mainly composed of gas (e.g., hot air) and tension.

1-3-3. Fiber Weight

As shown in FIG. 2, the region constituting the bottom of the groove portion 1 is adjusted such that the basis weight of the fibers 101 is less than that in the raised ridge portion 2. Further, the region constituting the bottom of the groove portion 1 is adjusted such that the basis weight is less than the average basis weight in the whole multilayer nonwoven fabric 140 including the region constituting the bottom of the groove portion 1 and the raised ridge portion 2.

It is preferable that the basis weight in the whole multilayer nonwoven fabric 140 is 10 to 200 g/m2, and particularly 20 to 100 g/m2. Consider a case where the multilayer nonwoven fabric 140 is used as a surface sheet in an absorbent article such as a sanitary napkin worn on the body, for example. In this case, when the basis weight in the whole multilayer nonwoven fabric 140 is less than 10 g/m2, the multilayer nonwoven fabric 140 has a risk of being easily damaged during use. On the other hand, when the basis weight is more than 200 g/m2, the liquid may not, in some cases, be easily transferred to the side opposite to the body.

Here, it is preferable that the basis weight in the region constituting the bottom of the groove portion 1 is not greater than 90%, particularly 3 to 90%, and further 30 to 70% of the basis weight in the raised ridge portion 2. When the basis weight in the region constituting the bottom of the groove portion 1 is greater than 90% of the basis weight in the raised ridge portion 2, resistance in a case where the liquid such as menstrual blood dropped on the groove portion 1 is moved downward (toward the side opposite to the side on which the liquid is dropped) is increased, so that the liquid such as menstrual blood may, in some cases, overflow from the groove portion 1. On the other hand, when the basis weight in the region constituting the bottom of the groove portion 1 is less than 3% of the basis weight in the raised ridge portion 2, strength in the multilayer nonwoven fabric 140 is reduced, so that the multilayer nonwoven fabric 140 may not, in some cases, be suitable for predetermined applications. For example, when the multilayer nonwoven fabric 140 is used as a surface sheet in an absorbent article such as a sanitary napkin, it may, in some cases, be damaged during use.

It is preferable that the basis weight in the raised ridge portion 2 is 15 to 250 g/m2, and particularly 25 to 120 g/m2, for example. Further, it is preferable that the fiber density in the raised ridge portion 2 is not more than 0.20 g/cm3, particularly 0.005 to 0.20 g/cm3, and further 0.007 to 0.07 g/cm3.

In a case where the basis weight in the raised ridge portion 2 is less than 15 g/cm2 and a case where the fiber density therein is less than 0.005 g/cm3, the raised ridge portion 2 may, in some cases, be crushed due to the weight of the fluid such as menstrual blood and external pressure. Further, the menstrual blood that has been absorbed once may, in some cases, return under pressure.

In a case where the basis weight in the raised ridge portion 2 is more than 250 g/cm2 and a case where the fiber density therein is more than 0.20 g/cm3, the menstrual blood that has been excreted into the raised ridge portion 2 is not easily transferred downward, so that it may, in some cases, stay in the raised ridge portion 2.

It is preferable that the basis weight in the region constituting the bottom of the groove portion 1 is 3 to 150 g/m2, and particularly 5 to 80 g/m2, for example. Further, it is preferable that the fiber density in the region constituting the bottom of the groove portion 1 is not more than 0.18 g/cm3, particularly 0.002 to 0.18 g/cm3, and further 0.005 to 0.05 g/cm3.

In a case where the basis weight in the region constituting the bottom of the groove portion 1 is less than 3 g/cm2 and a case where the fiber density therein is less than 0.002 g/cm3, when the multilayer nonwoven fabric 140 is arranged as a surface sheet in an absorbent article such as a sanitary napkin, as described above, for example, the multilayer nonwoven fabric 140 may, in some cases, be easily damaged during the use.

On the other hand, in a case where the basis weight in the region constituting the bottom of the groove portion 1 is more than 150 g/m2 and a case where the fiber density therein is more than 0.18 g/cm3, the liquid such as menstrual blood dropped on the groove portion 1 may, in some cases, be accumulated in the groove portion 1. In this case, the liquid may, in some cases, overflow from the groove portion 1 to diffuse Here, it is preferable that the ratio of the respective basis weights in the first fiber layer 141 and the second fiber layer 142 is in a range of 10:90 to 90:10, and particularly 20:80 to 50:50. In a case where the multilayer nonwoven fabric 140 is used as a surface sheet in an absorbent article such as a sanitary napkin, when the basis weight in the first fiber layer 141 is less than 10% of the basis weight in the multilayer nonwoven fabric 140, frictional resistance to the skin is high, so that there is a danger of causing rubbing and irritation. Conversely, when the basis weight in the first fiber layer 141 is more than 90% of the basis weight in the multilayer nonwoven fabric 140, the raised ridge portion 2 may, in some cases, be easily crushed by the weight of the menstrual blood and external pressure.

Even in a case where the groove portion 1 and the raised ridge portion 2 satisfy the above-mentioned conditions, for example, a case where a large amount of menstrual blood is excreted into the multilayer nonwoven fabric 140 and a case where high-viscosity menstrual blood is excreted thereinto, it is possible to inhibit the menstrual blood from diffusing over the surface. Even if external pressure in the thickness direction is applied to the multilayer nonwoven fabric 140 so that the raised ridge portion 2 is slightly crushed, for example, a space in the groove portion 1 (a valley) is easily held. Even when the menstrual blood or the like is excreted in this state, therefore, it may, in some cases, be possible to inhibit the menstrual blood from widely diffusing over the surface. Further, even if the menstrual blood that has been absorbed once returns under the external pressure, the menstrual blood can be inhibited from widely adhering to the skin again because a region of contact with the skin is small.

1-4. Others

It is preferable that the multilayer nonwoven fabric 140 in the present embodiment is employed to absorb or pass a predetermined liquid, for example, because the liquid permeates the region constituting the bottom of the groove portion 1 and is not easily held by the raised ridge portion 2 due to its porous structure.

The region constituting the bottom of the groove portion 1 is suitable for permeation of the liquid because the fiber density and the basis weight therein are low. Further, the fibers at the bottom of the groove portion 1 are oriented in the width direction, which can prevent the liquid from excessively flowing in the longitudinal direction of the groove portion 1 to spread throughout a wide range. Since in the region constituting the bottom of the groove portion 1, the fibers are oriented in the width direction (cross direction CD) of the groove portion 1 irrespective of the low basis weight, the strength in the width direction (CD strength) of the multilayer nonwoven fabric 140 is increased.

The basis weight in the raised ridge portion 2 is adjusted so as to be higher, so that the number of fibers is increased. Therefore, the number of fusion points is increased, so that the porous structure is maintained.

The multilayer nonwoven fabric 140 in the present embodiment is preferably a through-air nonwoven fabric.

1-5. Manufacturing Method and Mesh-Shaped Supporting Member

A method of manufacturing the multilayer nonwoven fabric 140 in the present embodiment will be described with reference to FIG. 6 to FIG. 9. A fiber web 100 serving as a multilayer fiber aggregate having a first fiber aggregate (not shown) formed in a sheet shape and composed of fibers having a degree of freedom and a second fiber aggregate formed in a substantially sheet shape laminated and arranged on a first surface of the first fiber aggregate and composed of fibers having a degree of freedom is placed on an upper surface of a mesh-shaped supporting member 210 serving as a permeable supporting member. In other words, the fiber web 100 is supported from below by the mesh-shaped supporting member 210. Here, predetermined fibers may be laminated and arranged on a predetermined surface of the mesh-shaped supporting member 210 so as to form a multilayer fiber aggregate, described above. Here, a state where fibers in a fiber aggregate have a degree of freedom means that at least some of the fibers composing the fiber aggregate are free. In other words, a state where fibers have a degree of freedom means that at least some of the fibers composing the fiber aggregate can change their positions and/or directions. In other words, a state where fibers have a degree of freedom means that at least some of the fibers composing the fiber aggregate can move.

The multilayer nonwoven fabric 140 in the present embodiment can be manufactured by moving the mesh-shaped supporting member 210 with the fiber web 100 supported thereon in a predetermined direction and continuously spraying gas from above an upper surface of the moved fiber web 100.

Here, the mesh-shaped supporting member 210 is produced in such a manner that a plurality of wires 211 having a predetermined thickness serving as an impermeable portion are weaved. The plurality of wires 211 are weaved a predetermined distance apart, to obtain a mesh-shaped supporting member having a plurality of holes 233 serving as a permeable portion formed therein.

Figure 4A:
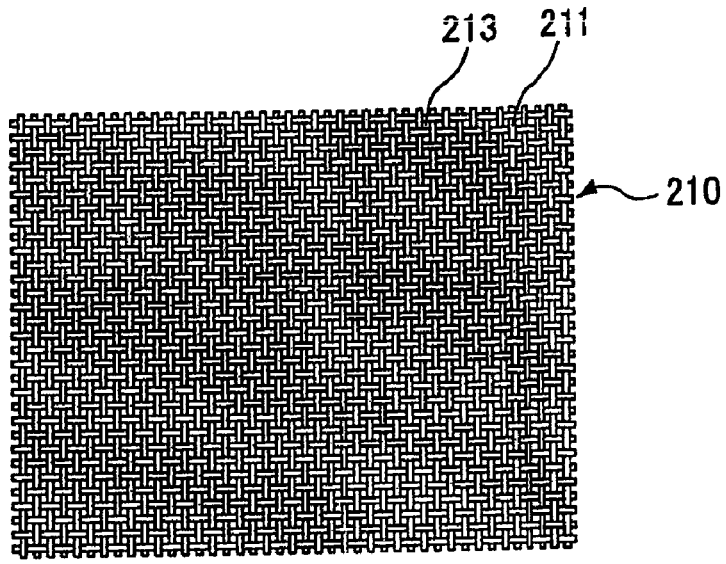
FIG. 4A is a plan view of a mesh-shaped supporting member.
Figure 4B:
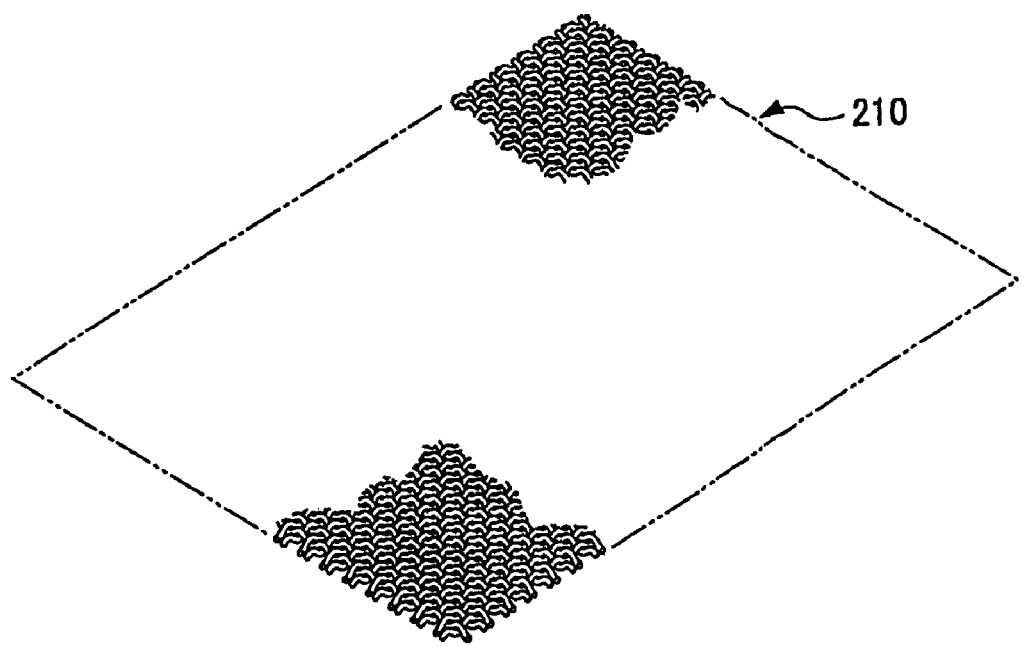
FIG. 4B is a perspective view of a mesh-shaped supporting member.

The mesh-shaped supporting member 210 shown in FIGS. 4A and 4B has the plurality of holes 213 having a small diameter formed therein, as described above. Gas that has been sprayed from above the upper surface of the fiber web 100 and has permeated the fiber web 100 is moved downward (toward the side opposite to the side on which the fiber web 100 is arranged) without being prevented by the mesh-shaped supporting member 210. The mesh-shaped supporting member 210 does not greatly change the flow of the gas to be sprayed and does not displace the fibers 101 toward the underside of the mesh-shaped supporting member 210.

The fibers 101 and 102 in the fiber web 100 are mainly displaced in a predetermined direction by the gas sprayed from above the upper surface of the fiber web 100. Specifically, the movement toward the underside of the mesh-shaped supporting member 210 is regulated, so that the fibers 101 and 102 are displaced in a direction along the surface of the mesh-shaped supporting member 210.

For example, the fibers 101 and 102 in a region on which the gas has been sprayed are displaced to an adjacent region. The fiber web 100 is moved in the longitudinal direction (machine direction (MD)) with the gas sprayed thereon, so that the region to which the fibers 101 and 102 are displaced, is formed along the longitudinal direction (machine direction (MD)). In other words, the fibers 101 and 102 are displaced sideward from the region on which the gas has been sprayed.

In such a way, the fibers 101 and 102 mainly oriented in the longitudinal direction (machine direction (MD)) are displaced sideward to form the groove portion 1. The fibers 101 and 102 oriented in the width direction (cross direction (CD)) perpendicular to the longitudinal direction (machine direction (MD)) are left at the bottom of the groove portion 1. Further, the raised ridge portion 2 is formed beside the groove portion 1, i.e., between the groove portion 1 and the adjacent groove portion 1. In the side parts of the raised ridge portion 2 formed by displacing the fibers 101 and 102 oriented in the machine direction from the region where the groove portion 1 is formed, the fiber density is increased, and the ratio of the fibers 101 and 102 oriented in the MD out of the fibers 101 and 102 is increased.

1-6. Manufacturing Apparatus

Figure 6:
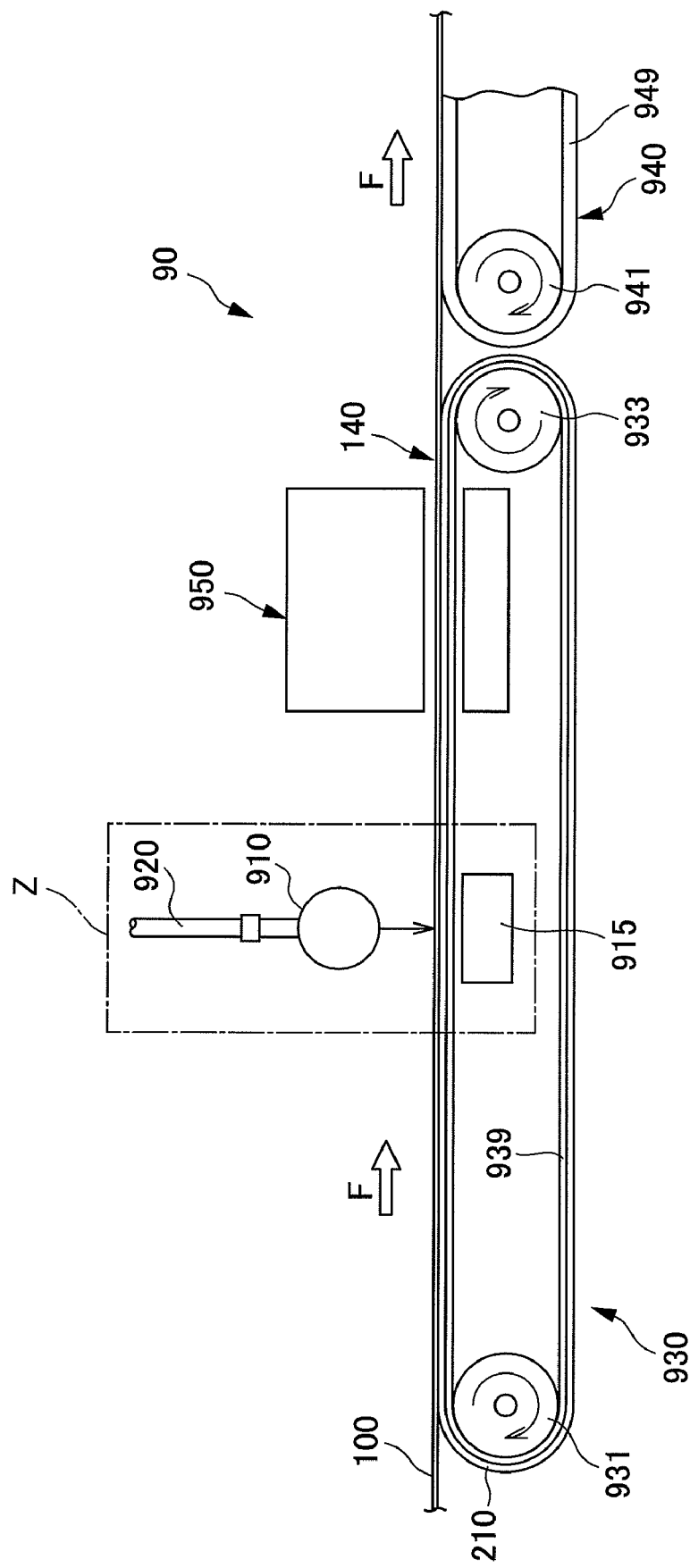
FIG. 6 is a side view for explaining a multilayer nonwoven fabric manufacturing apparatus.
Figure 7:
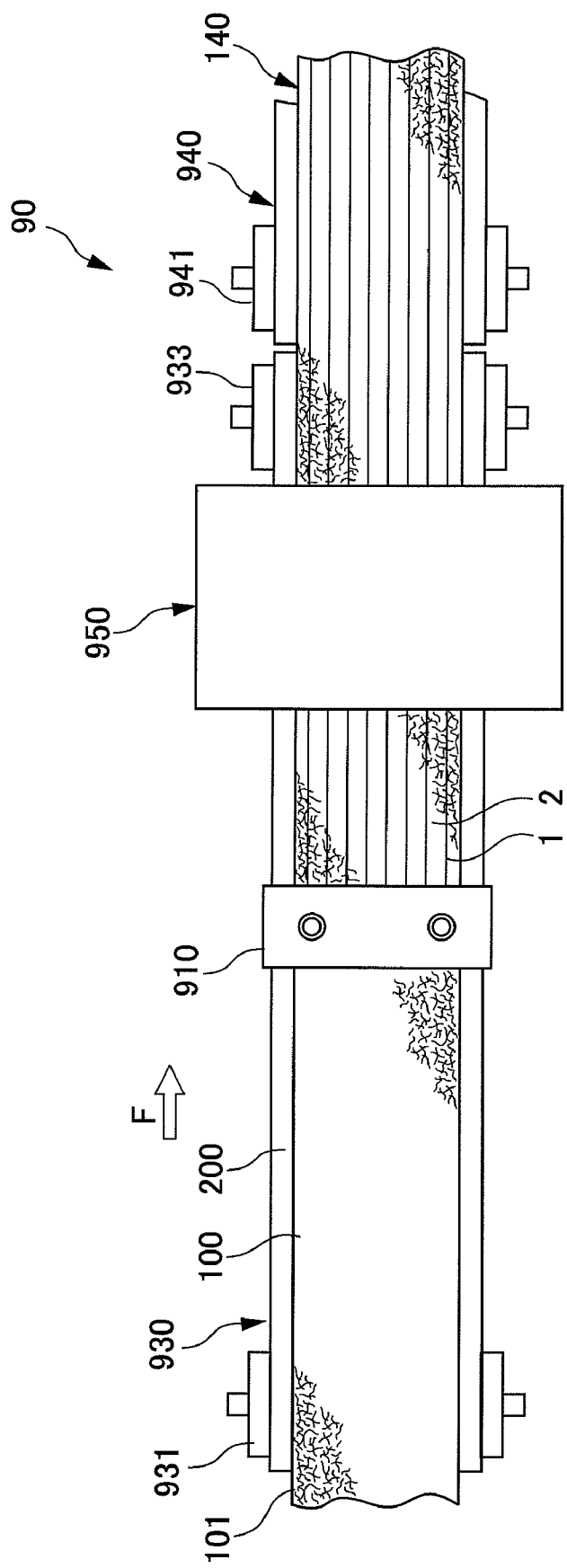
FIG. 7 is a plan view for explaining a multilayer nonwoven fabric manufacturing apparatus.
Figure 8:
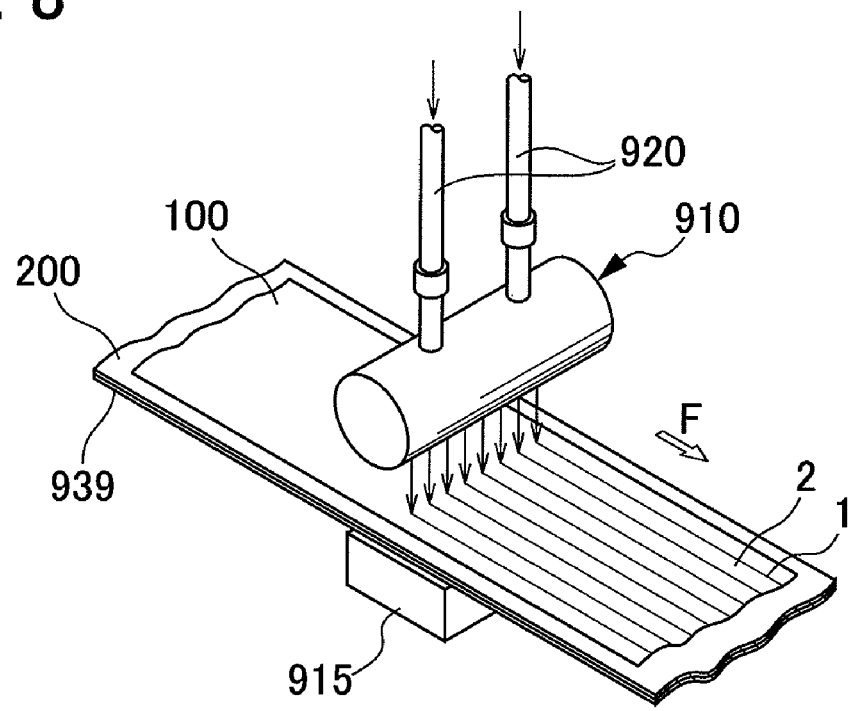
FIG. 8 is an enlarged perspective view of a region Z as defined in FIG. 6.

As shown in FIG. 6 or FIG. 7, a nonwoven fabric manufacturing apparatus 90 in the present embodiment manufactures a nonwoven fabric in which at least one of the fiber orientation, the fiber density, and the basis weight are adjusted by spraying a fluid mainly composed of gas on the fiber web 100 serving as a multilayer fiber aggregate formed in a sheet shape and composed of fibers having a degree of freedom.

The nonwoven fabric manufacturing apparatus 90 in the present embodiment manufactures a multilayer nonwoven fabric 140 by spraying a fluid mainly composed of gas on the fiber web 100 serving as a multilayer fiber aggregate formed in a sheet shape and composed of fibers having a degree of freedom. The nonwoven fabric manufacturing apparatus 90 comprises a permeable supporting member 200 for supporting the fiber web 100 on the first surface side, a spray portion 910 and an air supply portion (not shown) that constitute spraying means for spraying a fluid mainly composed of gas on the filter web 100 supported on the side of the first surface by the permeable supporting member 200 from the side of the second surface of the fiber web 100, and a conveyer 930 serving as moving means for moving the fiber web 100 in a predetermined direction F.

The conveyer 930 moves in the predetermined direction F the fiber web 100 supported on the side of the first surface by the permeable supporting member 200, and the spray portion 910 and the air supply portion (not shown) spray the fluid mainly composed of gas on the second surface of the fiber web 100 moved in the predetermined direction F by the conveyer 930.

This allows the fibers 101 and 102 composing the fiber web 100 to be displaced by a fluid mainly composed of gas sprayed from the spray portion 910 and/or a fluid mainly composed of gas sprayed from the spray portion 910, whose direction of flow has been changed by the impermeable portion formed in the permeable supporting member 200 after permeating the fiber web 100. The amount of displacement of the fibers 101 is adjusted to adjust the fiber orientation, the fiber density, or the basis weight in the fiber web 100, thereby forming the plurality of groove portions 1 and raised ridge portions 2. Here, although the multilayer nonwoven fabric manufacturing apparatus 90 forms the groove portions 1 in the multilayer nonwoven fabric 140 in the present embodiment, the present invention is not limited to the same. For example, a plurality of openings 3, described later, can be formed depending on the shape or the like of the permeable supporting member. In other words, a desired nonwoven fabric can be manufactured by designing the respective shapes and arrangements of the permeable portion and the impermeable portion in the permeable supporting member, described later, depending on the fiber orientation, the fiber density, or the basis weight to be adjusted and the shape of predetermined groove portions or openings to be formed.

Even if the same permeable supporting member is used, the degrees of change in the positions and/or the directions (the amounts of movement, etc.) of the fibers 101 and 102 composing the fiber web 100 can be adjusted by changing spraying conditions of a fluid mainly composed of gas. That is, the fiber orientation, the fiber density, or the basis weight and the shape of the groove portions, the openings, or the raised ridge portions, for example, in the nonwoven fabric can be adjusted by adjusting the spraying conditions of the fluid mainly composed of gas in addition to the shapes and the arrangements of the permeable portion and the impermeable portion in the permeable supporting member.

2. Second Embodiment

Figure 10:
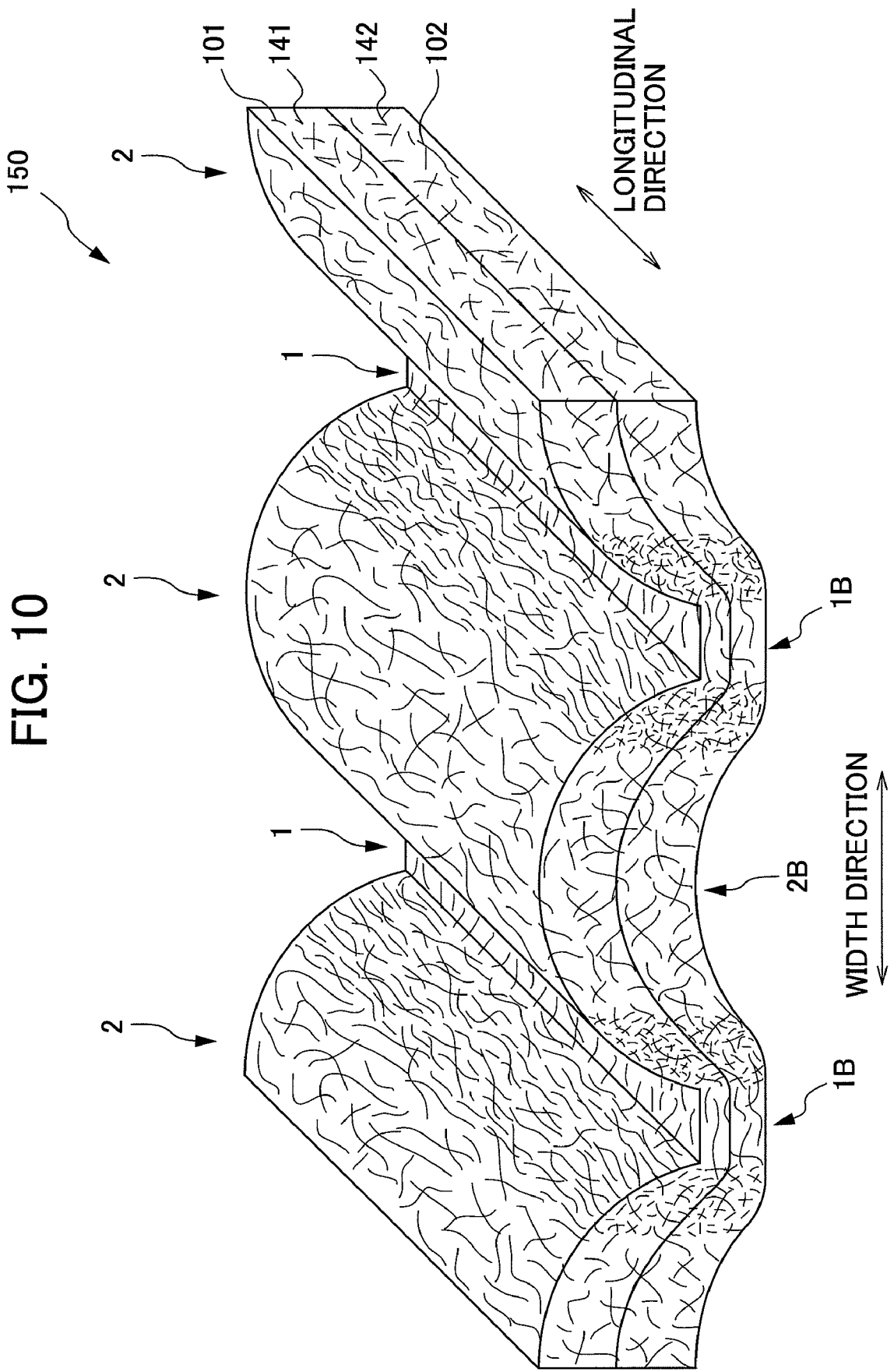
FIG. 10 is a perspective sectional view of a multilayer nonwoven fabric according to a second embodiment.

A multilayer nonwoven fabric 150 in a second embodiment will be described with reference to FIG. 10. The multilayer nonwoven fabric 150 is similar in shape to the multilayer nonwoven fabric 140 in the first embodiment, and differs therefrom in that a second surface (back surface) of a second fiber layer 142 is deformed so as to be projected in the same direction as the direction in which a first fiber layer 141 is projected. That is, a second surface, of the multilayer nonwoven fabric 150, of a raised ridge portion 2 is deformed so as to be projected toward a first surface, of the multilayer nonwoven fabric 150, of the raised ridge portion 2.

A surface, on the side opposite to the first fiber layer 141, of the second fiber layer 142 constituting the raised ridge portion 2 is deformed so as to be projected in the same direction as the direction in which a surface, on the side opposite to the second fiber layer 142, of the first fiber layer 141 is projected.

The multilayer nonwoven fabric 150 is so formed that the first surface and the second surface are in a wave shape in a thickness direction, as viewed from a width direction (CD) intersecting a longitudinal direction (MD) in which a groove portion 1 and a raised ridge portion 2 are formed so as to extend.

A plurality of second surface raised ridge portions 1B and a plurality of second surface groove portions 2B that are projected in the direction opposite to the direction in which the raised ridge portion 2 is projected are formed on a second surface, on the side opposite to the first fiber layer 141, of the second fiber layer 142.

3. Third Embodiment

Figure 11:
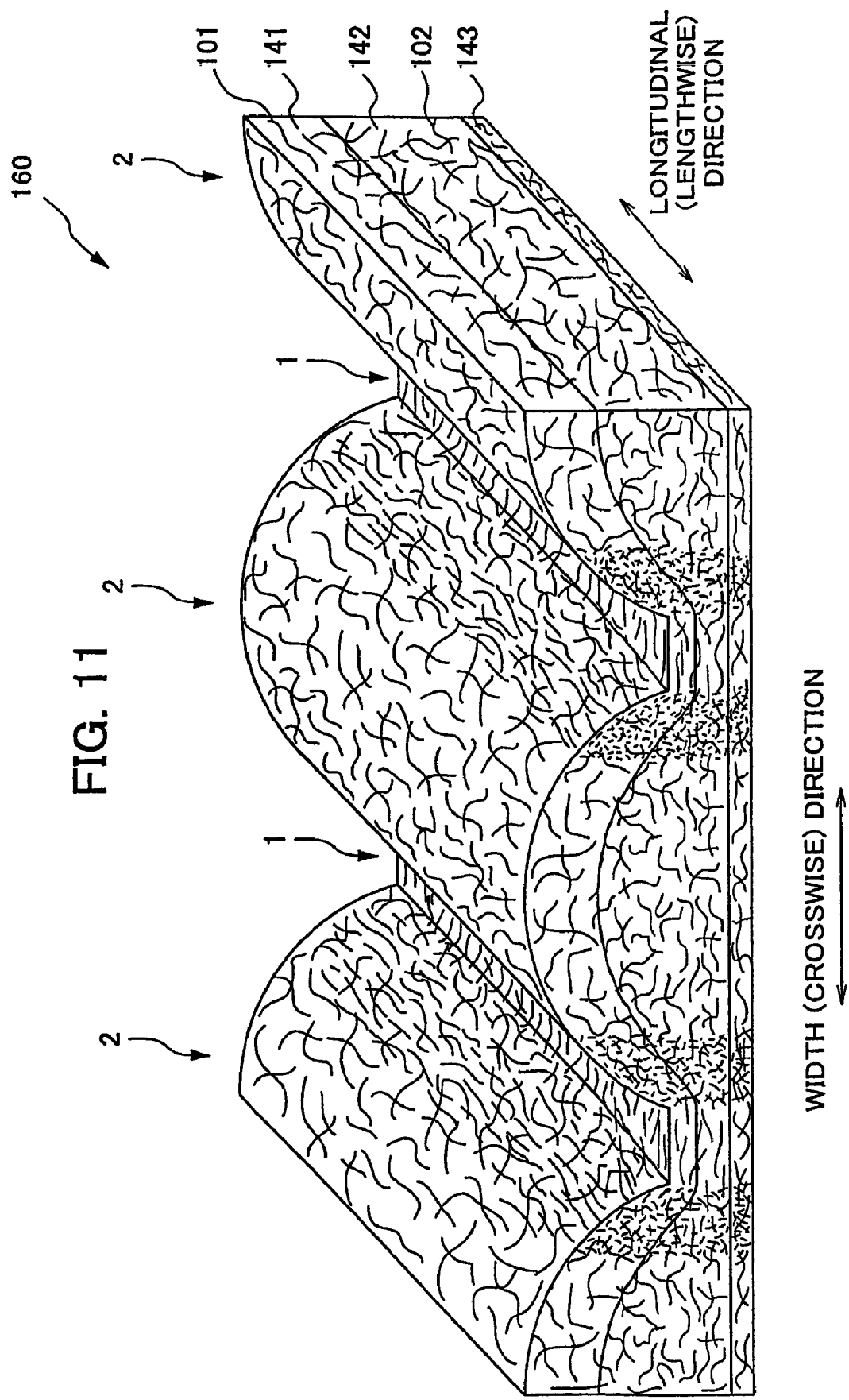
FIG. 11 is a perspective sectional view of a multilayer nonwoven fabric according to a third embodiment.

A multilayer nonwoven fabric 160 in a third embodiment will be described with reference to FIG. 11. The multilayer nonwoven fabric 160 is a multilayer nonwoven fabric obtained by further arranging a third fiber layer 143 on the second surface of the second fiber layer 142 in the multilayer nonwoven fabric 140 in the first embodiment, that is, a third fiber layer 143 on the second surface, on the side opposite to the first fiber layer 141, of the second fiber layer 142 in the multilayer nonwoven fabric 140.

It is possible to give a predetermined function, strength, and so on by further arranging the third fiber layer 143. For example, it is possible to improve shape maintenance properties, cushioning properties, and so on by arranging the third fiber layer 143.

4. Fourth Embodiment

Figure 12:
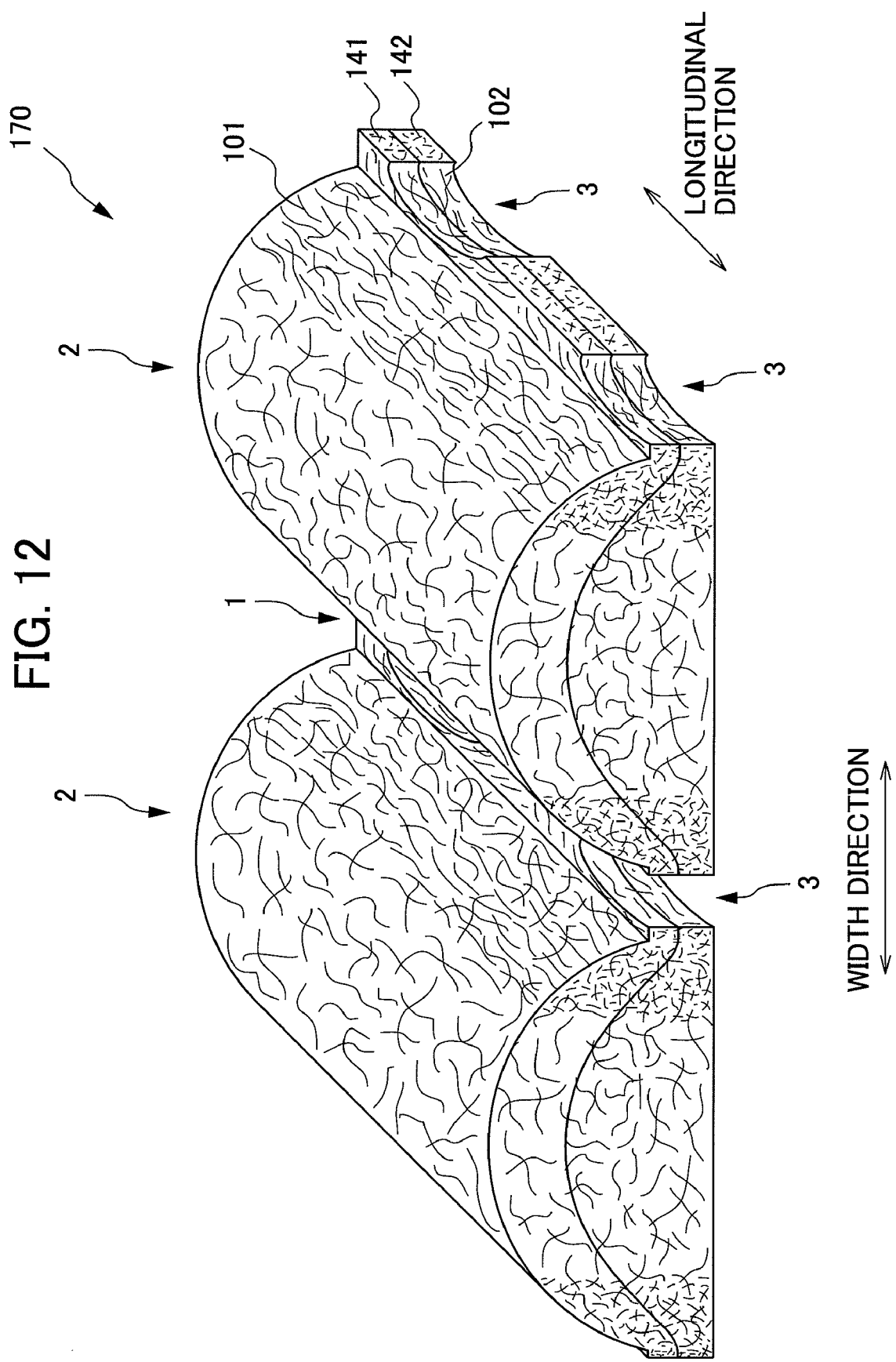
FIG. 12 is a perspective sectional view of a multilayer nonwoven fabric according to a fourth embodiment.
Figure 13A:
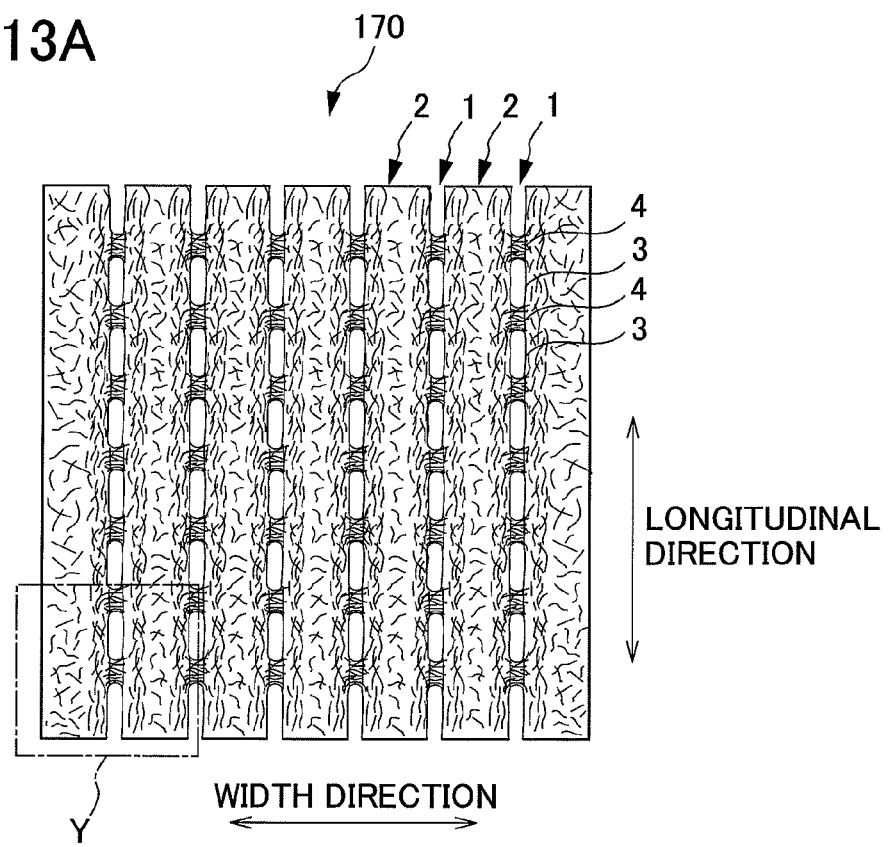
FIG. 13A is a plan view of a multilayer nonwoven fabric according to a fourth embodiment.
Figure 13B:
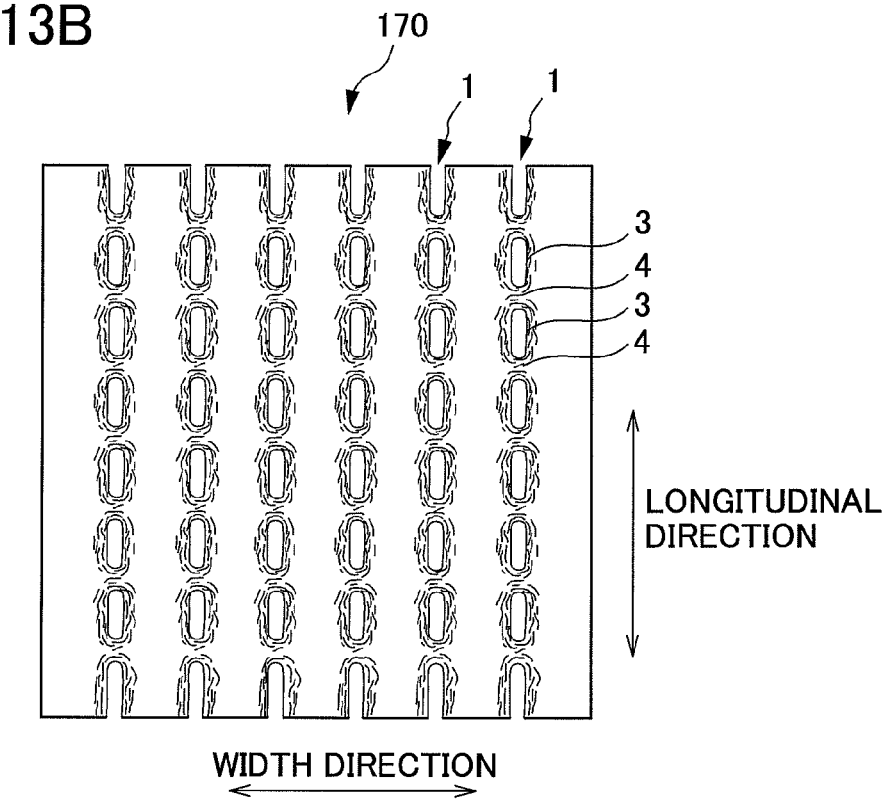
FIG. 13B is a bottom view of a multilayer nonwoven fabric according to a fourth embodiment.

A multilayer nonwoven fabric 170 in a fourth embodiment will be described with reference to FIG. 12. The multilayer nonwoven fabric 170 is a multilayer nonwoven fabric obtained by forming a plurality of openings 3 serving as low basis weight portions with predetermined spacing at the bottom of the groove portion 1 in the multilayer nonwoven fabric 140 in the first embodiment.

Here, although the plurality of openings 3 serving as low basis weight portions are formed at the bottom of a groove portion 1 in the multilayer nonwoven fabric 170, the low basis weight portions may be depressions formed such that the thickness of the multilayer nonwoven fabric 170 in the groove portion 1 is reduced, for example. The bottom of the groove portion 1 is in such a shape that a difference of elevation is formed along a longitudinal direction (machine direction MD) in which the groove portion 1 is formed.

4-1. Groove Portion and Opening

As shown in FIG. 12, FIG. 13A, FIG. 13B, or FIG. 15, the multilayer nonwoven fabric 170 in the present embodiment has the plurality of openings 3 formed therein, as described above. Specifically, the multilayer nonwoven fabric 170 is a multilayer nonwoven fabric in which a plurality of groove portions 1 formed along the longitudinal direction (machine direction (MD)) are almost equally spaced in a parallel manner as viewed from a width direction (cross direction (CD)) of the first surface, and a plurality of openings 3 are formed along the bottom of each of the groove portions 1. Each of the plurality of openings 3 is formed in a substantially circular shape or a substantially elliptical shape as viewed from its upper surface that is the first surface of the multilayer nonwoven fabric 170. Here, although in the present embodiment, the groove portions 1 are almost equally spaced in a parallel manner in the machine direction, the present invention is not limited to the same. For example, the groove portions 1 may be differently spaced. Alternatively, the groove portions 1 may be formed not in a parallel manner but such that the spacing therebetween is changed. Raised ridge portions 2 can be formed such that their respective heights are not uniform but different from one another.

A connecting portion 4 formed so as to connect the raised ridge portion 2 and the adjacent raised ridge portion 2 is formed between the opening 3 and the adjacent opening 3.

4-2. Fiber Orientation, Fiber Density, and Basis Weight

4-2-1. Fiber Orientation

As shown in FIG. 12, FIG. 13A, FIG. 13B, or FIG. 15, fibers 101 and 102 in the connecting portion 4 are oriented in a direction intersecting the longitudinal direction. Specifically, the fibers 101 oriented in the machine direction (MD) are displaced toward side parts of the raised ridge portion 2 by spraying a fluid mainly composed of gas (e.g., hot air) and the fibers 101 oriented in the width direction (cross direction (CD)) perpendicular to the machine direction (MD) are left, so that almost all of the fibers 101 arranged at the bottom of the groove portion 1 are oriented in the width direction (CD).

The fibers 101 and 102 arranged in the side parts of the raised ridge portion 2 are mainly oriented in the longitudinal direction (machine direction (MD)). The ratio of the fibers 101 and 102 arranged in the side parts of the raised ridge portion 2 and oriented in the longitudinal direction (MD) is greater than the ratio of the fibers 101 and 102 arranged at the center (a region between the side parts) of the raised ridge portion 2 and oriented in the longitudinal direction (MD).

The fibers 101 and 102 around (at a circumferential edge of) the opening 3 are oriented along the circumference of the opening 3. In other words, the fibers 101 and 102 arranged in the vicinities of both ends, as viewed from the longitudinal direction (MD) of the groove portion 1, of the opening 3 are oriented in the direction intersecting the longitudinal direction (MD). Both the ends, as viewed from the width direction (CD), of the opening 3 are oriented in the longitudinal direction (MD).

4-2-2. Fiber Density

In the multilayer nonwoven fabric 170, the fibers 101 and 102 oriented in the longitudinal direction (machine direction (MD)) are displaced toward the side parts of the raised ridge portion 2 by spraying hot air or the like thereon. The number of fibers 101 that are arranged in the side parts of the raised ridge portion 2 and are oriented in the machine direction therefore increases. This causes the number of intersections at which the fibers are fused to increase and further cause the fiber density of the fibers to increase. Therefore, the porous structure of the whole raised ridge portion 2 is more easily maintained. In the connecting portion 4 constituting the bottom of the groove portion 1, the fiber density is adjusted depending on the shape and the size of the opening 3.

4-2-3. Fiber Weight Per Unit Region

In the multilayer nonwoven fabric 170, the region constituting the bottom of the groove portion 1 is adjusted such that the basis weight of the fibers 101 and 102 is less than that in the raised ridge portion 2. Further, the basis weight in the region constituting the bottom of the groove portion 1 is adjusted so as to be less than the average basis weight in the whole multilayer nonwoven fabric 170 including the groove portion 1 and the raised ridge portion 2.

The raised ridge portion 2 is adjusted such that the basis weight of the fibers 101 and 102 is greater than that in the region constituting the bottom of the groove portion 1, as described above. Further, the basis weight in the region constituting the bottom of the groove portion 1 is adjusted so as to be less than the average basis weight in the whole multilayer nonwoven fabric 170 including the groove portion 1 and the raised ridge portion 2.

4-3. Others

When the multilayer nonwoven fabric 140 in the present embodiment is employed to absorb or pass a predetermined liquid, it produces such a function that the liquid permeates the bottom of the groove portion 1 and is not easily held by the raised ridge portion 2 due to the porous structure. Further, not only the liquid but also a solid can permeate the opening 3 formed in the groove portion 1.

Since the plurality of openings 3 are formed at the bottom of the groove portion 1, the liquid and the solid can suitably permeate. Further, a large proportion of the fibers 101 and 102 arranged at the bottom of the groove portion 1 (the connecting portion 4) are oriented in the width direction (cross direction (CD)) perpendicular to the longitudinal direction (machine direction (MD)), which can prevent the liquid dropped on the groove portion 1 from flowing in the longitudinal direction of the groove portion 1 to move toward a wide range. Since the fibers 101 and 102 arranged at the bottom of the groove portion 1 are oriented in the width direction at the time of manufacturing, the strength in the width direction (CD strength) is high at the bottom of the groove portion 1 (the connecting portion 4) irrespective of the low basis weight.

The basis weight in the raised ridge portion 2 is adjusted so as to be greater, as a result the number of fibers increases, as described above. Therefore, the number of intersections at which the fibers are fused increases, so that the formed porous structure is suitably maintained.

4-4. Manufacturing Method and Mesh-Shaped Supporting Member

Figure 14A:
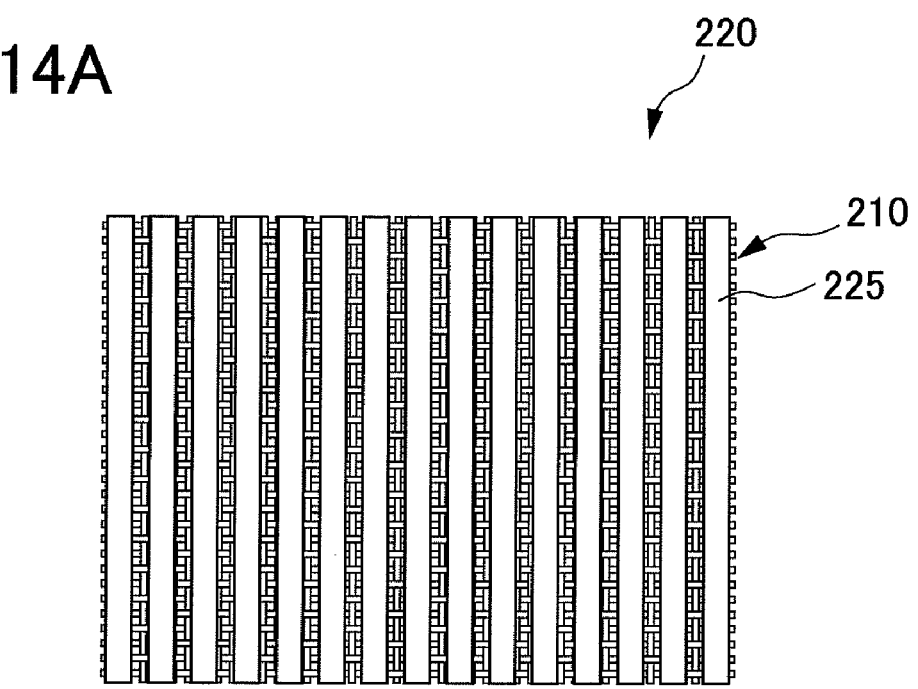
FIG. 14A is a plan view of a supporting member in which elongated members are equally spaced in parallel in a mesh-shaped supporting member.
Figure 14B:
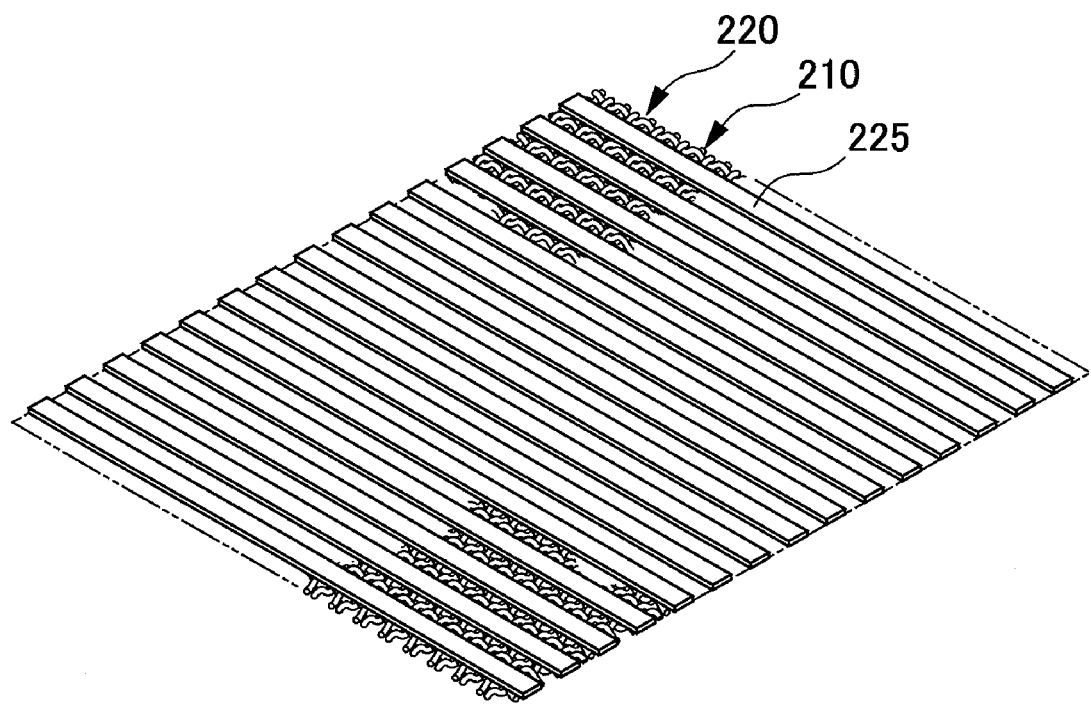
FIG. 14B is a perspective view of a supporting member in which elongated members are equally spaced in parallel in a mesh-shaped supporting member.

A method of manufacturing the multilayer nonwoven fabric 170 in the present embodiment will be described. First, the fiber web 100 is placed on an upper surface of a supporting member 220 shown in FIG. 14A or 14B serving as a permeable supporting member. In other words, the fiber web 100 is supported from below by the supporting member 220.

The supporting member 220 with the fiber web 100 supported thereon is moved in the longitudinal direction (machine direction (MD)). The multilayer nonwoven fabric 170 in the present embodiment can be manufactured by continuously spraying gas from above the upper surface of the moved fiber web 100.

The supporting member 220 is arranged in a conveyer in such a manner that elongated members 225 are arranged along the cross direction (CD) perpendicular to the machine direction (MD). The supporting member 220 with the fiber web 100 placed on its upper surface is moved in the machine direction (MD). This causes gas to be continuously sprayed on the upper surface of the fiber web in a direction substantially perpendicular to the direction in which the elongated members 225 extend. Specifically, the groove portion 1 is formed along the longitudinal direction, i.e., the direction substantially perpendicular to the direction in which the elongated members 225 extend. The opening 3, described later, is formed in a region arranged on an upper surface of the elongated member 225 in a region where the groove portion 1 is formed.

As described above, the supporting member 220 is a supporting member in which the plurality of elongated members are spaced a predetermined distance apart substantially parallel to one another on an upper surface of the mesh-shaped supporting member 210 shown in FIG. 4. The elongated member 225 is an impermeable member that gas sprayed from above (from one side) does not permeate downward (toward the other side). In other words, the direction of flow of the gas sprayed on the elongated member 225 is changed.

The elongated member 225 does not displace the fibers 101 and 102 composing the fiber web 100 from the top (from one side) to the bottom (to the other side) of the supporting member 220.

This causes the fibers 101 and 102 composing the fiber web to be displaced by gas sprayed from above the upper surface of the fiber web 100 and/or gas whose direction of flow has been changed by the elongated member 225 after permeating the fiber web 100.

The fibers 101 and 102 arranged in a region on which the gas is sprayed are displaced to an adjacent region. Specifically, the fibers 101 and 102 oriented in the longitudinal direction (machine direction (MD)) are displaced in the width direction (cross direction (CD)) perpendicular to the machine direction (MD).

Thus, the groove portion 1 is formed. The fibers 101 and 102 that remain un-displaced are oriented in the width direction (CD), to constitute the bottom of the groove portion 1. That is, the fibers 101 and 102 composing the bottom of the groove portion 1 are oriented in the width direction (CD). Further, the raised ridge portion 2 is formed between the groove portion 1 and the adjacent groove portion 1. In the side parts of the raised ridge portion 2, the fiber density increases as a result of the above-mentioned displaced fibers 101 and 102. The ratio of fibers 101 and 102 composing the side parts that are arranged so as to be oriented in the longitudinal direction (MD), increases.

Furthermore, the sprayed gas, whose direction of flow has been changed by the elongated member 225 after permeating the fiber web 100, also displaces the fibers 101 and 102 composing the fiber web 100 in a direction which is different to the foregoing direction.

Since the mesh-shaped supporting member 210 and the elongated member 225, which constitute the supporting member 220, regulate the displacement of the fibers 101 toward a lower surface, on the side opposite to the side on which the fiber web 100 is arranged, of the supporting member 220, the fibers 101 and 102 are displaced along an upper surface, on which the fiber web 100 is placed, of the supporting member 220.

Specifically, the gas sprayed on the elongated member 225 flows along a surface of the elongated member 225 after the direction of flow thereof has been changed. The gas whose direction of flow has been thus changed causes the fibers 101 arranged on the upper surface of the elongated member 225 to be moved from the upper surface of the elongated member 225 to the surrounding region. This causes the opening 3 having a predetermined shape to be formed and causes at least one of the orientation, the density, or the basis weight of the fibers 101 and 102 to be adjusted.

Figure 19A:
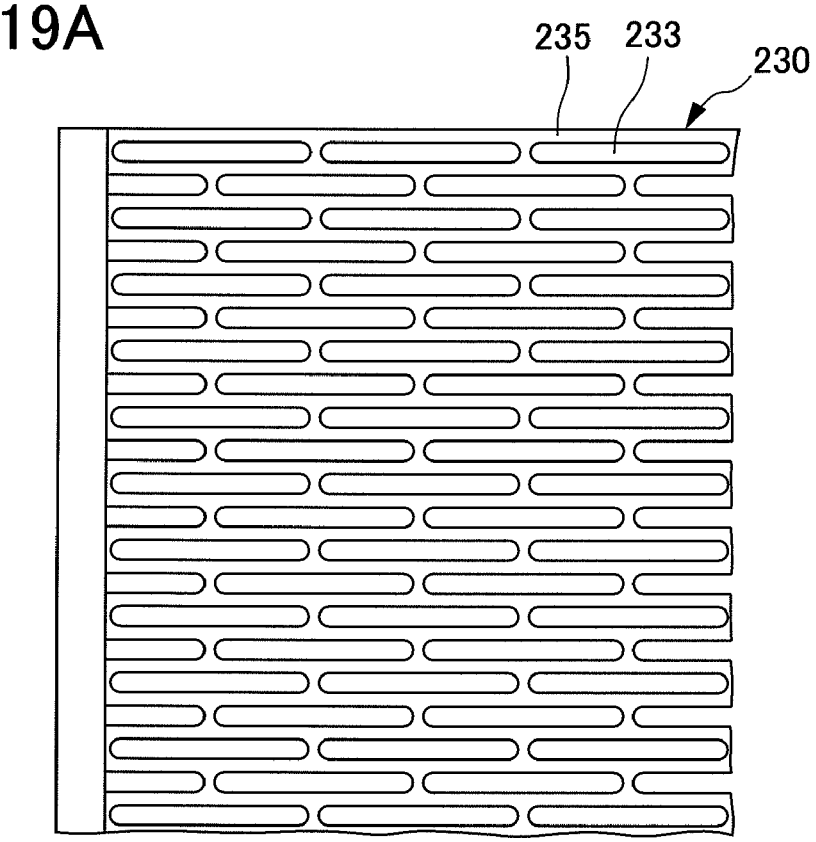
FIG. 19A is a plan view of a plate-shaped supporting member having a plurality of elliptical openings formed therein.
Figure 19B:
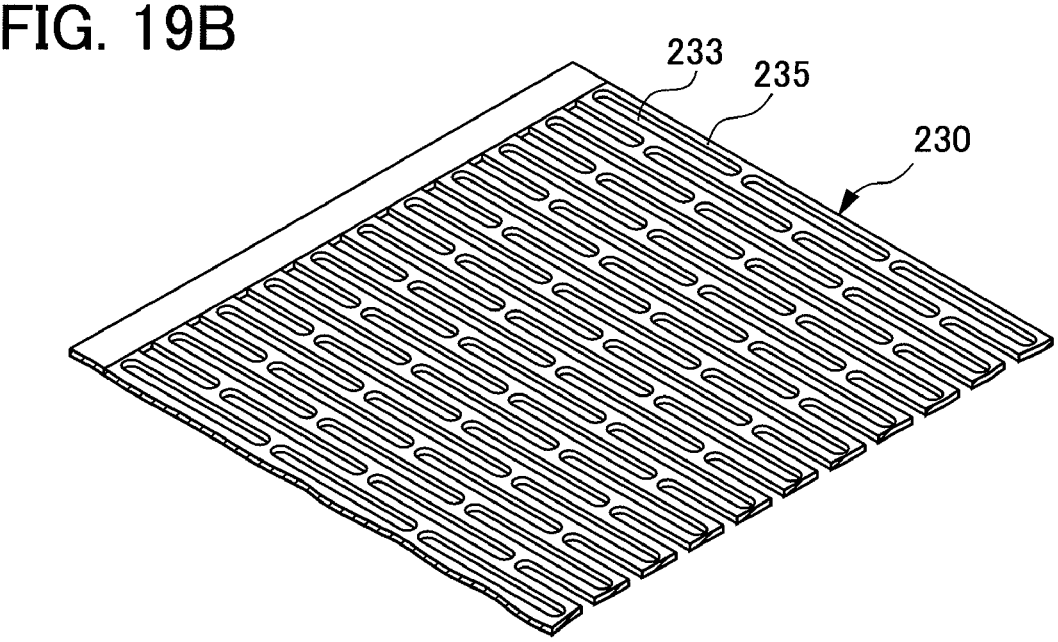
FIG. 19B is a perspective view of a plate-shaped supporting member having a plurality of elliptical openings formed therein.

Here, the multilayer nonwoven fabric 170 in the present embodiment can be obtained even if a supporting member 230 shown in FIG. 19A or 19B is used by adjusting the temperature, the amount or the strength of a fluid mainly composed of gas to be sprayed on the fiber web 100 or adjusting the movement speed of the fiber web 100 in moving means to adjust tension or the like.

The multilayer nonwoven fabric 170 in the present embodiment can be manufactured by a multilayer nonwoven fabric manufacturing apparatus 90. A method of manufacturing the multilayer nonwoven fabric 170 in the multilayer nonwoven fabric manufacturing apparatus 90 can refer to the above-mentioned description of the method of manufacturing the multilayer nonwoven fabric 170 and the multilayer nonwoven fabric manufacturing apparatus 90.

5. Fifth Embodiment

A multilayer nonwoven fabric 140A in a fifth embodiment will be described with reference to FIG. 17. The multilayer nonwoven fabric 140A is a multilayer nonwoven fabric obtained by forming the multilayer nonwoven fabric 140 in the first embodiment so as to have a wave shape as viewed from the longitudinal direction (machine direction (MD)) in which the groove portion 1 and the raised ridge portion 2 in the multilayer nonwoven fabric 140 are formed. A first surface, on the side of a first fiber layer 141, of the multilayer nonwoven fabric 140A rises and falls in a wave shape, and a second surface (a back surface), on the side of a second fiber layer 142, of the multilayer nonwoven fabric 140A rises and falls in a wave shape.

A second surface (an inner side surface), on the side of the second fiber layer 142, of the first fiber layer 141 constituting the multilayer nonwoven fabric 140A has a wave shape, and a first surface (an inner side surface), on the side of the first fiber layer 141, of the second fiber layer 142 has a wave shape.

Figure 16:
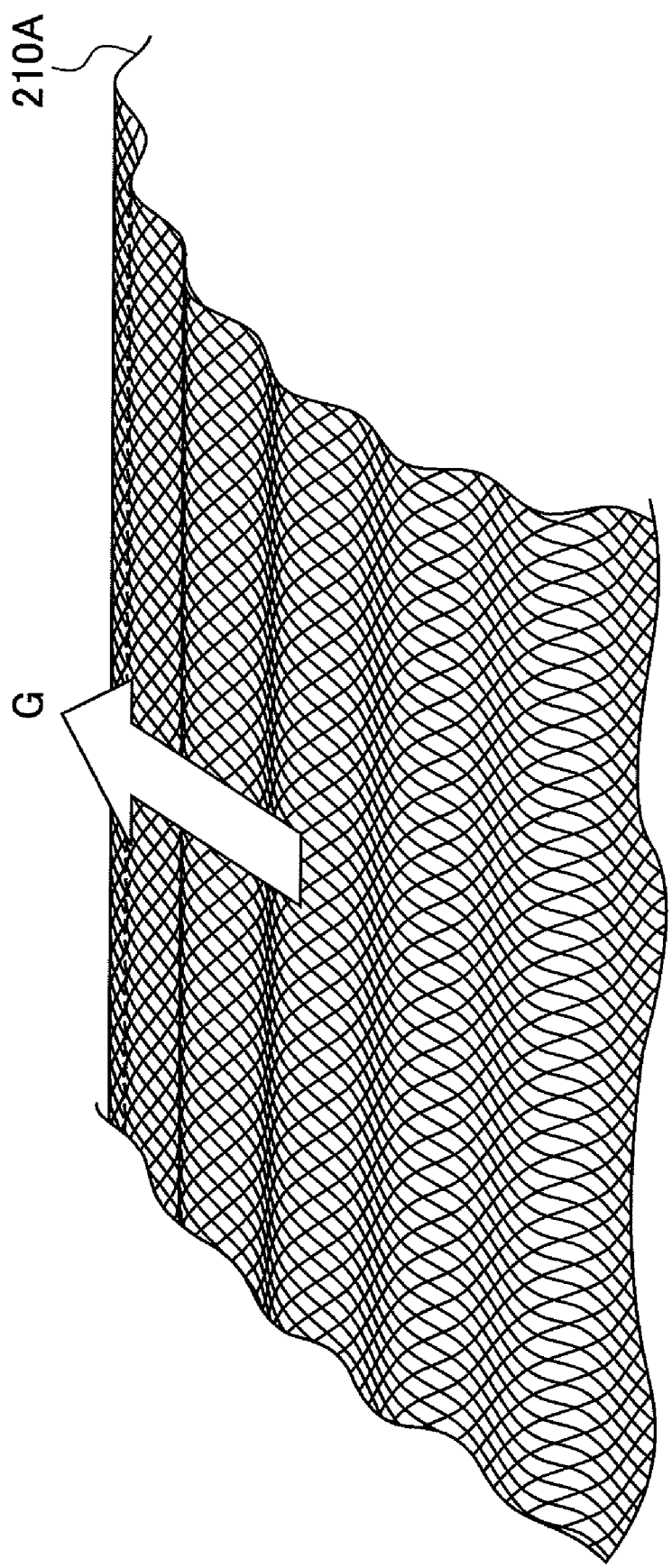
FIG. 16 is a perspective view of a mesh-shaped supporting member having a wave-shaped rise and fall formed therein.

For example, the multilayer nonwoven fabric 140A is manufactured using a mesh-shaped supporting member 210A provided with a wave-shaped rise and fall in a direction indicated by an arrow G shown in FIG. 16. That is, the mesh-shaped supporting member 210A provided with the wave-shaped rise and fall shown in FIG. 16 is used as a permeable supporting member, so that the multilayer nonwoven fabric 140A is wholly formed in a wave shape along the mesh-shaped supporting member 210A.

The raised ridge portion 2 is formed in a wave shape in a longitudinal direction (machine direction (MD)) indicated by the arrow G. A predetermined portion, in a fiber web 100, constituting the raised ridge portion 2 is provided with a wave-shaped rise and fall by being deformed along the shape of the mesh-shaped supporting member 210A.

The groove portion 1 is formed in a wave shape in the longitudinal direction (MD) indicated by the arrow G. A predetermined portion, in the fiber web 100, constituting the groove portion 1 is provided with a wave-shaped rise and fall by being deformed along the shape of the mesh-shaped supporting member 210A.

Although such a wave-shaped rise and fall pattern can be suitably designed, a case where the pitch of the wave-shaped rise and fall as viewed from the direction indicated by the arrow G serving as the machine direction (MD), for example, is 1 to 30 mm, and particularly 3 to 10 mm can be exemplified. Further, a case where a difference of elevation in the rise and fall is 0.5 to 20 mm, and particularly 3 to 10 mm can be exemplified. Here, examples of the shape of the rise and fall in the mesh-shaped supporting member 210 include zigzag shapes that are triangular and square in cross section in addition to the above-mentioned wave shape.

Although the multilayer nonwoven fabric 140A is formed so as to rise and fall in a wave shape along the direction in which the groove portion 1 or the like is formed (the direction in which the groove portion 1 extends), serving as the machine direction (MD), the present invention is not limited to the same. For example, the rise and fall in the wave shape or the like can be formed irrespective of the direction in which the groove portion 1 or the like is formed.

6. Sixth Embodiment

A multilayer nonwoven fabric 170A in a sixth embodiment will be described with reference to FIG. 18. The multilayer nonwoven fabric 170A is a multilayer nonwoven fabric obtained by forming the multilayer nonwoven fabric 170 in the fourth embodiment in a wave shape as viewed from the longitudinal direction (machine direction (MD)) in which the groove portion 1 and the raised ridge portion 2 in the multilayer nonwoven fabric 170 are formed. Alternatively, the multilayer nonwoven fabric 170A is a multilayer nonwoven fabric obtained by continuously forming, in the region constituting the bottom of the groove portion 1 in the multilayer nonwoven fabric 140A in the fifth embodiment, a plurality of openings 3 with predetermined spacing along the bottom. The whole shape of the multilayer nonwoven fabric 170A and the shape of a rise and fall or the like in a region constituting the bottom of a groove portion 1 and a raised ridge portion 2 can use the description in the multilayer nonwoven fabric 140A in the fifth embodiment.

The multilayer nonwoven fabric 170A is manufactured using a plate-shaped supporting member 230 having holes 233 alternating with plates 235 in a direction indicated by an arrow G, as shown in FIG. 20. That is, the multilayer nonwoven fabric 170A is provided with a wave-shaped rise and fall by being moved in the direction indicated by the arrow G with the multilayer nonwoven fabric 170A supported on the plate-shaped supporting member 230 while spraying a fluid mainly composed of gas from above a surface, on the side opposite to a surface supported on the plate-shaped supporting member 230, of the multilayer nonwoven fabric 170A so that fibers arranged on an upper surface of each of the holes 233 enter the hole 233.

The mesh-shaped supporting member 210A provided with the wave-shaped rise and fall shown in FIG. 16 is used as a permeable supporting member, so that the multilayer nonwoven fabric 170A is wholly formed along the wave-shaped rise and fall in the mesh-shaped supporting member 210A. When the thickness of the plate-shaped supporting member 230 is 0.5 to 20 mm, for example, a wave-shaped rise and fall is provided as viewed from the direction indicated by the arrow G serving as the machine direction (MD).

7. Fiber Structure

Fiber structures in the first fiber layer and the second fiber layer in the above-mentioned embodiment will be exemplified below. An example of the first fiber layer is a fiber layer that is a mixture of fibers A having a core-sheath structure of low-density polyethylene (a melting point of 110 degrees C.) and polyethylene terephthalate, having an average fineness of 3.3 dtex, having an average fiber length of 51 mm, and being coated with a hydrophilic oil solution and fibers B having a core-sheath structure of high-density polyethylene (a melting point of 135 degrees C.) and polyethylene terephthalate, having an average fineness of 3.3 dtex, having an average fiber length of 51 mm, and being coated with a water-repellent oil solution. The mixture ratio of the fibers A and the fibers B in the first fiber layer is 70:30, and the basis weight of the fibers therein is adjusted to 15 g/m2. An example of the second fiber layer is a fiber layer composed of 100% fibers having a core-sheath structure of high-density polyethylene and polyethylene terephthalate, having an average fineness of 4.4 dtex, having an average fiber length of 38 mm, and being coated with a hydrophilic oil solution. The basis weight in the fiber layer is 25 g/m2.

An example of the first fiber layer is a fiber layer composed of 100% fibers having a core-sheath structure of high-density polyethylene (a melting point of 135 degrees C.) and polyethylene terephthalate, having an average fineness of 2.2 dtex, having an average fiber length of 51 mm, containing 2% by mass and 3% by mass of titanium oxide per the respective masses of cores and sheaths, and being coated with a hydrophilic oil solution. The basis weight in the fiber layer is 20 g/m2. An example of the second fiber layer is a fiber layer containing fibers C having an eccentric core-sheath type core-sheath structure of high-density polyethylene and polyethylene terephthalate, having an average fineness of 5.6 dtex, having an average fiber length of 51 mm, containing 1% by mass of titanium oxide per the mass of cores, and being coated with a hydrophilic oil solution and fibers D having a core-sheath structure of high-density polyethylene and polyethylene terephthalate, having an average fineness of 3.3 dtex, having an average fiber length of 51 mm, containing 1% by mass of titanium oxide per the mass of cores, and being coated with a hydrophilic oil solution. The mixture ratio of the fibers C and the fibers D in the fiber layer is 50:50, and the basis weight therein is 20 g/m2.

Furthermore, in a multilayer nonwoven fabric in which a first fiber layer is composed of a fiber aggregate by a carding process, a second fiber layer is composed of a fiber aggregate by an airlaid process, and a third fiber layer is composed of a fiber aggregate by a carding process, a fiber structure or the like of each of the fiber layers will be exemplified bellow.

An example of the first fiber layer is a fiber layer composed of 100% fibers having a core-sheath structure of high-density polyethylene and polyethylene terephthalate, having an average fineness of 3.3 dtex, having an average fiber length of 51 mm, containing 1% by mass and 2% by mass of titanium oxide per the respective masses of cores and sheaths, and being coated with a hydrophilic oil solution, and formed by a carding process such that the basis weight therein is 15 g/m2.

An example of the second fiber layer is a fiber layer composed of 100% fibers having a core-sheath structure of high-density polyethylene and polyethylene terephthalate, having an average fineness of 5.6 dtex, having an average fiber length of 4 mm, containing 1% by mass of titanium oxide per the mass of cores, and being coated with a hydrophilic oil solution, and laminated and formed by an airlaid process such that the basis weight therein is 20 g/m2.

An example of the third fiber layer is a fiber layer composed of 100% fibers having a core-sheath structure of high-density polyethylene and polypropylene, having an average fineness of 2.2 dtex, having an average fiber length of 38 mm, containing 1% by mass of titanium oxide per the mass of cores, and being coated with a hydrophilic oil solution, and formed by a carding process such that the basis weight therein is 10 g/m2.

8 Inventive Examples

8-1. First Example

Fiber Structure

Used as the first fiber layer was a fiber layer that is a mixture of fibers A having a core-sheath structure of low-density polyethylene (a melting point of 110 degrees C.) and polyethylene terephthalate, having an average fineness of 3.3 dtex, having an average fiber length of 51 mm, and being coated with a hydrophilic oil solution and fibers B having a core-sheath structure of high-density polyethylene (a melting point of 135 degrees C.) and polyethylene terephthalate, having an average fineness of 3.3 dtex, having an average fiber length of 51 mm, and being coated with a water-repellent oil solution. The mixture ratio of the fibers A and the fibers B in the first fiber layer was 70:30, and the basis weight therein was adjusted to 15 g/m2.

Used as the second fiber layer was a fiber layer composed of 100% fibers having a core-sheath structure of high-density polyethylene and polyethylene terephthalate, having an average fineness of 4.4 dtex, having an average fiber length of 38 mm, and being coated with a hydrophilic oil solution. The basis weight in the fiber layer was 25 g/m2.

Manufacturing Conditions

Figure 9:
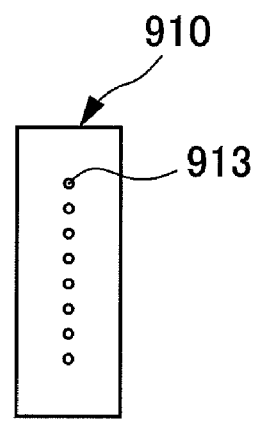
FIG. 9 is a bottom view of a spray unit in FIG. 8.

The plurality of spray ports 913 shown in FIG. 9 are formed with a diameter of 1.0 mm and a pitch of 6.0 mm. The shape of the spray port 913 is a substantially circle, and the cross-sectional shape of a hole (a spray port) is a circle. The width of the spray portion 910 is 500 mm. Hot air was sprayed under conditions such as a temperature of 105 degrees C. and an air volume rate of 1200 l/minute.

A raw fabric composed of fibers previously described was opened using a carding machine with a speed of 20 m/minute, to produce a multilayer fiber web. The multilayer fiber web was cut so as to have a width of 450 mm. The fiber web was arranged on a 20-mesh permeable net moved in a predetermined direction at a speed of 3 m/minute. The hot air was sprayed on a first surface of the multilayer fiber web by the spray portion 910 previously described, while being sucked in (drawn) from below the permeable net at a rate less that that of the sprayed hot air. After irregularities (groove portions and raised ridge portions) were thus formed, the fiber web was conveyed in approximately 30 seconds within an oven set at a temperature of 125 degrees C. and hot blast air amount of 10 Hz with the fiber web arranged on the permeable net.
Results
An obtained multilayer nonwoven fabric will be described below.
Raised ridge portion: the basis weight was 51 g/m2, the thickness was 3.4 mm (the thickness at the top was 2.3 mm), the fiber density was 0.03 g/cm3, the width of one raised ridge portion was 4.6 mm, and the pitch between raised ridge portions was 5.9 mm.
Second fiber layer in raised ridge portion: the thickness was 2.9 mm (the thickness at the top was 1.3 mm).
Groove portion: the basis weight was 24 g/m2, the thickness was 1.7 mm, the density was 0.01 g/cm3, the width of one groove portion was 1.2 mm, and the pitch between groove portions was 5.8 mm.
Shape: the back surface of the groove portion constituted an outermost back surface of the nonwoven fabric, and the back surface of the raised ridge portion was raised upward not to constitute the outermost back surface of the nonwoven fabric. The raised ridge portion was in a dome shape, and the raised ridge portions and the groove portions were formed so as to continuously extend in the longitudinal direction (machine direction (MD)) and were alternately formed as viewed from the width direction (cross direction (CD)). On the outermost surface of the raised ridge portion, the respective strengths of the fibers at their intersections partially differed and the density of the fibers was the lowest.

8-2. Second Example

Fiber Structure
A fiber structure in the second example was the same as the fiber structure in the first example.
Manufacturing Conditions
Hot air was sprayed under conditions such as a temperature of 105 degrees C. and an air volume rate of 1000 l/minute in nozzle design previously shown, and was sucked in (drawn) from below the permeable net in an amount approximately equal to or slightly more than the air volume.
Results
An obtained multilayer nonwoven fabric will be described below.
Raised ridge portion: the basis weight was 49 g/m2, the thickness was 2.5 mm, the fiber density was 0.02 g/cm3, the width of one raised ridge portion was 4.7 mm, and the pitch between raised ridge portions was 6.1 mm.
Second fiber layer in raised ridge portion: the thickness was 2.9 mm.
Groove portion: the basis weight was 21 g/m2, the thickness was 1.8 mm, the density was 0.01 g/cm3, the width of one groove portion was 1.4 mm, and the pitch between groove portions was 6.1 mm.
Shape: a back surface of the raised ridge portion was formed in a flat shape.

8-3. Third Example

Fiber. Structure
Used as the first fiber layer was a fiber layer composed of 100% fibers having a core-sheath structure of high-density polyethylene, polyethylene terephthalate, and polypropylene, having an average fineness of 3.3 dtex, having an average fiber length of 51 mm, containing 1% by mass and 2% by mass of titanium oxide per the respective masses of cores and sheaths, and being coated with a hydrophilic oil solution, and formed by a carding process such that the basis weight therein would be 15 g/m2.
Used as the second fiber layer was a fiber layer composed of 100% fibers having a core-sheath structure of high-density polyethylene and polyethylene terephthalate, having an average fineness of 5.6 dtex, having an average fiber length of 4 mm, containing 1% by mass of titanium oxide per the mass of cores, and being coated with a hydrophilic oil solution, and laminated and formed by an airlaid process such that the basis weight would be 20 g/m2.
Used as the third fiber layer was a fiber layer composed of 100% fibers having a core-sheath structure of high-density polyethylene and polypropylene, having an average fineness of 2.2 dtex, having an average fiber length of 38 mm, containing 1% by mass of titanium oxide per the mass of cores, and being coated with a hydrophilic oil solution, and formed by a carding process such that the basis weight therein would be 10 g/m2.
Manufacturing Conditions
Manufacturing conditions in the second example were the same as those in the first example.
Results
An obtained multilayer nonwoven fabric will be described below.
Raised ridge portion: the basis weight was 51 g/m2, the thickness was 2.9 mm, the density was 0.02 g/cm3, the width of one raised ridge portion was 4.7 mm, and the pitch between raised ridge portions was 6.1 mm.
The respective thicknesses of the first fiber layer, the second fiber layer, and the third fiber layer in the raised ridge portion were 1.0 mm, 1.3 mm, and 0.6 mm.
Groove portion: the basis weight was 18 g/m2, the thickness was 1.8 mm, the density was 0.01 g/cm3, the width of one groove portion was 1.4 mm, and the pitch between groove portions was 6.1 mm.

8-4. Fourth Example

Fiber Structure
A fiber structure in the fourth example were the same as the fiber structure in the first example.
Manufacturing Conditions
The fourth example was the same as the first example except that a supporting member, described below, was used in place of the permeable net.
Supporting Member
Used as the plate-shaped supporting member 230 shown in FIG. 19A or 19B was a plate-shaped supporting member in which the hole 233 having a length of 2 mm by a width of 70 mm was spaced 3 mm apart from the adjacent hole 233. The thickness of the plate-shaped supporting member 230 was 0.5 mm. The plate-shaped supporting member 230 was constructed of stainless steel.

Manufacturing Conditions

Manufacturing conditions in the fourth example were same as those in the first example.

Results

An obtained multilayer nonwoven fabric will be described below.

Raised ridge portion: the basis weight was 43 g/m2, the thickness was 2.8 mm, the density was 0.02 g/cm3, the width of one raised ridge portion was 4.7 mm, and the pitch between raised ridge portions was 6.5 mm.

Second fiber layer in raised ridge portion: the thickness was 1.5 mm.

Groove portion: the basis weight was 10 g/m2, the thickness was 1.2 mm, the density was 0.008 g/cm3, the width of one groove portion was 1.8 mm, and the pitch between groove portions was 6.5 mm.

Slightly raised portion in groove portion: the basis weight was 21 g/m2, the thickness was 1.9 mm, the density was 0.01 g/cm3, the width of one slightly raised portion was 1.8 mm, the length of one slightly raised portion was 1.5 mm, the width direction or CD pitch was 6.5 mm, and the longitudinal direction or MD pitch was 5.0 mm.

Slightly depressed portion (opening) in groove portion: the basis weight was 0 g/m2, the thickness was 0 mm, the density was 0 g/cm3, the width of one slightly depressed portion was 1.8 mm, the length of one slightly depressed portion was 3.2 mm, the CD pitch was 6.5 mm, the MD pitch was 5.0 mm, the opening region of one slightly depressed portion was 4.2 mm2, and the shape was a vertically long ellipse.

Shape: the slightly raised portions and the slightly depressed portions (openings) were formed in the groove portion 1.

9 Examples of Applications

Examples of applications of the multilayer nonwoven fabric in the present invention include a surface sheet in an absorbent article such as a sanitary napkin, a liner, or a diaper. In this case, a raised ridge portion may be directed toward either a skin surface or a back surface on the side opposite to the skin surface. However, the region in contact with the skin is reduced by directing the raised ridge portion toward the skin surface, reducing the likelihood of a wet sensation being experienced by the user as a result of body fluid. Furthermore, the multilayer nonwoven fabric can be also employed as an intermediate sheet between the surface sheet in the absorbent article and an absorber. In this case, a region in contact with the surface sheet or the absorber is reduced, thus reducing the likelihood that body fluid can return from the absorber. The multilayer nonwoven fabric can be suitably employed even in a side sheet in the absorbent article, an outer surface (an outerback) of the diaper or the like, a surface fastener female material, and so on because an region in contact with the skin is reduced and it has a cushioning feeling. The multilayer nonwoven fabric can be employed in many fields such as a wiper, a mask, a mother's milk pad, and so on for removing dust, dirt, or the like that has adhered to the floor or the body.

9-1. Surface Sheet in Absorbent Article

Figure 21:
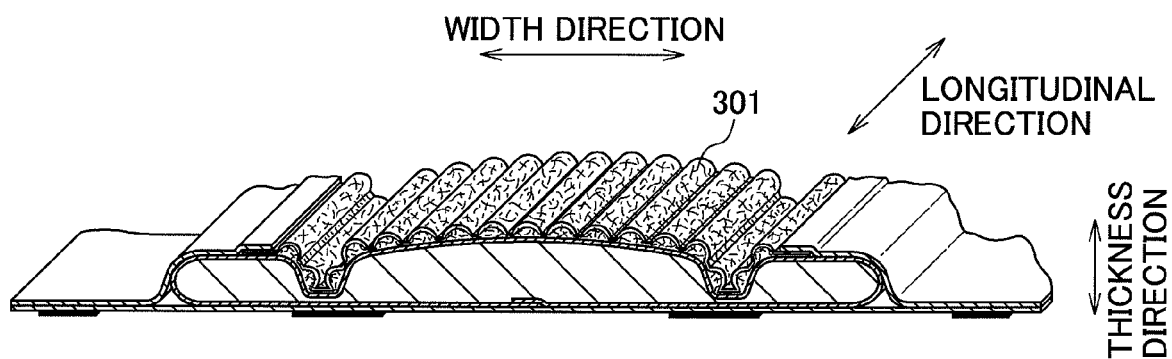
FIG. 21 is a perspective view of a case where a nonwoven fabric according to the present invention is used as a surface sheet in a sanitary napkin.
Figure 22:
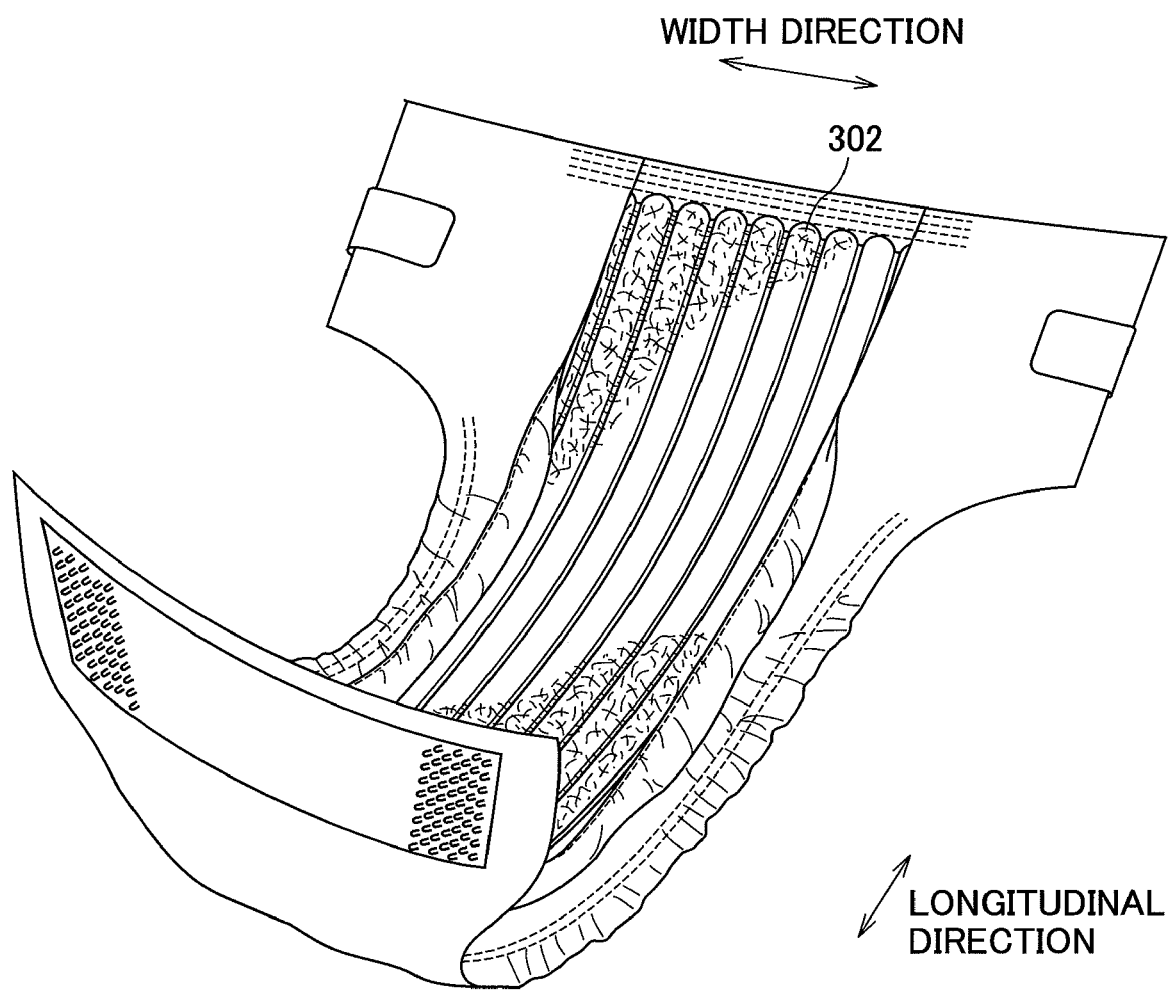
FIG. 22 is a perspective view of a case where a nonwoven fabric according to the present invention is used as a surface sheet in a diaper.

A case where the application of the multilayer nonwoven fabric in the present invention is a surface sheet in an absorbent article will be described below. As shown in FIG. 21 and FIG. 22, a multilayer nonwoven fabric in which fibers composing a first fiber layer, toward which a second fiber layer is also projected, have a high degree of freedom and that has irregularities (groove portions 1 and raised ridge portions 2) formed on the first surface can be used as surface sheets 301 and 302 in the absorbent article (the sanitary napkin or the diaper) by being arranged such that projections are directed toward a skin surface. Since the fibers composing the first fiber layer constituting the raised ridge portion 2 that comes into direct contact with the skin have a relatively high degree of freedom, so that even a wearer with sensitive skin does not readily feel a foreign-body sensation. On the other hand, fibers composing the inside of the raised ridge portion 2 compose the second fiber layer having a relatively low degree of freedom. Furthermore, the center 9 of the raised ridge portion 2 contains a large number of fibers oriented in a thickness direction. Even if a load is applied to the raised ridge portion 2, the raised ridge portion 2 is not easily crushed. Even if a load is further applied so that the raised ridge portion 2 is crushed, recovery properties after release of the load are high.

This allows the maintenance properties of a skin feeling in the absorbent article to be maintained. That is, an absorbent article having such properties that the surface layer feels nice and soft and a raised ridge portion is not easily crushed during use, can be obtained. When the fiber density is low and further the basis weight is low in the region constituting the bottom of a depression (the groove portion 1), the number of fibers is low. This allows a liquid dropped on the depression to be quickly transferred downward (toward the side opposite to the side on which the liquid is dropped) because the number of inhibitory elements of liquid permeation is low. Even if the fiber density and the basis weight in the region constituting the bottom of the groove portion 1 are low, the tensile strength in the width direction is high because most of the fibers are oriented in the width direction. Therefore, even if a force such as friction is applied in the width direction during use, the multilayer nonwoven fabric can be prevented from being damaged.

When the fiber density in the second fiber layer is greater than that in the first fiber layer, a coarse-dense gradient is provided as viewed from the thickness direction. Therefore, a liquid excreted into the first fiber layer can be suitably transferred to the second fiber layer, which makes it more difficult for the liquid to adhere to the skin.

9-2. Intermediate Sheet in Absorbent Article

Figure 23:
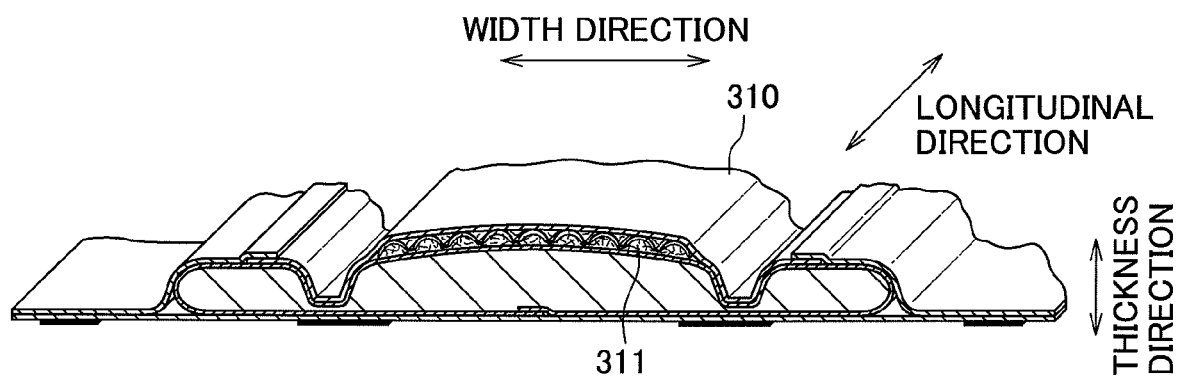
FIG. 23 is a perspective view of a case where a nonwoven fabric according to the present invention is used as an intermediate sheet in an absorbent article.
Figure 24:
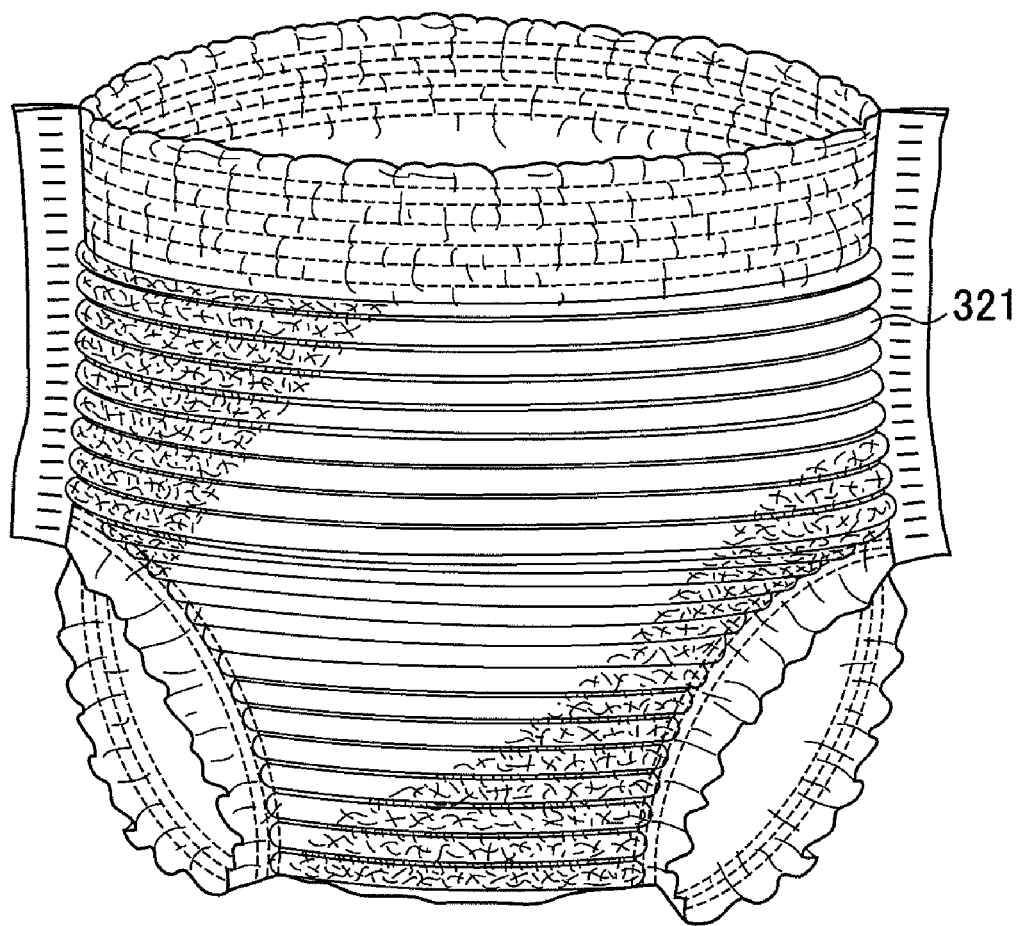
FIG. 24 is a perspective view of a case where a nonwoven fabric according to the present invention is used as an outer sheet in an absorbent article.

A case where the application of the multilayer nonwoven fabric in the present invention is an intermediate sheet in an absorbent article will be described below. As shown in FIG. 23, a multilayer nonwoven fabric in which fibers composing a first fiber layer, toward which a second fiber layer is also projected, have a high degree of freedom and that has irregularities (groove portions 1 and raised ridge portions 2) formed on the first surface can be used as an intermediate sheet 311 in an absorbent article in which projections are arranged on the side of a surface sheet 310. The intermediate sheet 311 is arranged between the surface sheet 310 and an absorber. The multilayer nonwoven fabric is arranged such that the projections are directed toward the surface sheet 310, so that there are provided a plurality of spaces formed by the surface sheet 310 and the groove portions 1. Therefore, even if a large amount of liquid is excreted into the surface sheet 310 at high speed the liquid can be prevented from spreading on the surface sheet 310 because the number of inhibitory elements of liquid permeation is low. Furthermore, even if a liquid that has been absorbed by the absorber returns, the liquid does not easily adhere to the skin because a ratio of contact between the multilayer nonwoven fabric and the surface sheet 310 is low (a contact region therebetween is low).

The fiber density in the second fiber layer is greater than that in the first fiber layer. Furthermore, the center 9 of the raised ridge portion 2 contains a larger number of fibers oriented in the thickness direction, as compared with that in the periphery thereof. The vertex of the raised ridge portion 2 and the surface sheet 310 are brought into contact with each other. This makes it easy to draw the liquid that has remained on the surface sheet 310 in the thickness direction and makes it difficult for the liquid to remain on the surface sheet 310. This allows spot properties on the surface sheet 310 and low residual properties of the liquid to be obtained, which can prevent the liquid from adhering to the skin for a long time.

9-3. Outerback of Absorbent Article

A case where the application of the multilayer nonwoven fabric in the present invention is an outerback of an absorbent article will be described below. As shown in FIG. 23, a multilayer nonwoven fabric in which fibers composing a first fiber layer, toward which a second fiber layer is projected, have a high degree of freedom and that has irregularities (groove portions 1 and raised ridge portions 2) formed on the first surface can be used as an outer surface (outerback) 321 of a diaper or the like. A feeling produced by the first fiber layer in the raised ridge portion 2 is good. In addition thereto, the persistence of the feeling is high because the raised ridge portion 2 is not easily crushed by the second fiber layer even if a load is applied thereto.

10. Each Component 10-1. Fiber Aggregate

A nonwoven fabric in the present invention is obtained by spraying a fluid mainly composed of gas on a multilayer fiber aggregate in a substantially sheet shape such as a fiber web 100 having a first fiber web 100A and a second fiber web 100B, as shown in FIG. 1, for example, laminated thereon, to adjust the fiber orientation, the fiber density, or the basis weight or form predetermined groove portions or openings.

The fiber aggregate is a multilayer fiber aggregate formed in a sheet shape and is in a state where fibers composing the fiber aggregate have a degree of freedom. In other words, at least some of the fibers composing the multilayer fiber aggregate are in a free state. At least some of the fibers composing the multilayer fiber aggregate are included in a state where a positional relationship thereamong can be changed The multilayer fiber aggregate can be produced by spraying a fiber blend that is a mixture of a plurality of fibers so as to form a fiber layer having a predetermined thickness. Specifically, the multilayer fiber aggregate can be produced by spraying a plurality of different fibers a plurality of times so as to laminate the fibers to form a fiber layer.

Examples of a (multilayer) fiber aggregate in the present invention include a fiber web produced by a carding process or a fiber web in which thermally fused fibers have not been solidified, a web produced by an airlaid process or a fiber web in which thermally fused fibers have not been solidified, a fiber web, in which thermally fused fibers have not been solidified, embossed by a point bonding process, a fiber aggregate, which has not been embossed, spun by a spun bonding process or a fiber aggregate, in which thermally fused fibers have not been solidified, embossed and a fiber web produced by a needle punching process and half-entangled, a fiber web produced by a spun lacing process and half-entangled, a fiber aggregate, in which thermally fused fibers have not been solidified, spun by a melt blowing process, and a fiber aggregate, in which fibers have not been solidified with a solvent, produced by a solvent bonding process.

Preferably, the fiber web produced by a carding process using relatively long fibers makes it easy to rearrange the fibers by air (gas) flow. A further example is a web, before thermal fusion, produced by only entangling in a state where fibers are easily displaced. In order to form groove portions (irregularities) or the like by a plurality of air (gas) flows, described later, and then form a nonwoven fabric with the shape thereof held, a through-air process for thermally fusing thermoplastic fibers included in a fiber aggregate by performing oven treatment (heat treatment) using a predetermined heater or the like is preferable.

Usable as the multilayer fiber web in the above-mentioned embodiment is one in which a plurality of fiber webs having different properties and functions are overlapped with one another.

10-2. Fibers

Examples of fibers composing a fiber aggregate (e.g., the fibers 101 composing the fiber web 100 shown in FIG. 1) include fibers composed of thermoplastic resins such as low-density polyethylene, high-density polyethylene, straight-chain polyethylene, polypropylene, polyethylene terephthalate, modified polypropylene, modified polyethylene terephthalate, nylon, and polyamide alone or in combination.

Examples of a composite form include a core-sheath type in which the melting point of a core component is greater than that of a sheath component, an eccentric core-sheath type, and a side-by-side type in which right and left components differ in melting points. Further, hollow fibers, modified cross-section fibers such as flat, Y-type, and C-type cross-section fibers, latent and manifest three-dimensional crimped fibers, splittable fibers to be divided by a physical load such as water flow, heat, or embossing, and so on may be mixed.

In order to form the three-dimensional crimped shape, predetermined manifest crimped fibers and latent crimped fibers can be mixed. Here, examples of the three-dimensional crimped shape include a spiral shape, a zigzag shape, and a $\Omega$ shape. Even if the fibers are wholly oriented in a plane direction, they are partially oriented in a thickness direction. This causes the buckling strength of the fibers themselves to be exerted in the thickness direction. Even if external pressure is applied to the fibers, therefore, the bulk of the fibers is not easily reduced. Furthermore, if the fibers are in the spiral shape out of the shapes, the fibers attempt to return to their original shape when the applied external pressure is released. Even if the nonwoven fabric is crushed such that the thickness thereof slightly decreases upon application of excess external pressure, therefore, it easily returns to its original thickness after the external pressure is released.

The manifest crimped fibers are general name of fibers previously crimped by giving a shape using machine crimping or a core-sheath structure of an eccentric core-sheath type, a side-by-side type, or the like. The latent crimped fibers develop crimps by application of heat.

In the case of the machine crimping, the crimped state can be controlled by a difference in peripheral speed, heat, pressurization in a machine direction (MD) for linear fibers continuously after spinning. The greater the number of crimps per unit length of the fibers, the greater the buckling strength of the fibers when an external pressure is applied. For example, it is preferable that the number of crimps per unit length of the fibers is in a range of 10 to 35 per inch and further a range of 15 to 30 per inch.

Examples of fibers to be crimped by heat shrinkage include fibers composed of two or more resins that differ in melting points. Such fibers are crimped in a three-dimensional manner depending on a difference in heat shrinkage percentages at the time of heating. Examples of a resin structure of thermally crimped fibers include respective core-sheath structures of an eccentric core-sheath type in which cores are shifted from its center in a cross section and a side-by-side type in which resins respectively composing one half and the other half of fibers in a cross section differ in melting points. The heat shrinkage percentage of such fibers is 5 to 90%, and preferably 10 to 80%, for example.

A method of measuring the heat shrinkage percentage makes it possible to (1) produce a fiber web of 200 gsm (g/m2) by 100% fibers to be measured, (2) cut the fiber web to a size of 250 mm by 250 mm to produce a sample, (3) leave the sample within an oven with a temperature of 145 degrees C. (418.15K) for five minutes, (4) measure the length of the sample that has heat-shrunk, and (5) calculate the heat shrinkage percentage from a difference between the lengths before and after the heat shrinkage.

When the multilayer nonwoven fabric is used as a surface sheet, it is preferable that the fineness is in a range of 1.1 to 8.8 dtex in consideration of entrance of a liquid and a skin feeling, for example.

When the multilayer nonwoven fabric is used as a surface sheet, cellulosic hydrophilic fibers such as pulp, chemical pulp, rayon, acetate, and natural cotton may be contained in order to absorb a small amount of menstrual blood, sweat, or the like remaining on the skin, for example, as fibers composing a fiber aggregate. However, the cellulosic fibers do not easily discharge a liquid that has been absorbed once. Therefore, a case where the mixture ratio of the cellulosic fibers to the whole multilayer nonwoven fabric is in a range of 0.1 to 5% by mass, for example, can be taken as a preferable form. Furthermore, it is preferable that the cellulosic liquid hydrophilic fibers are contained in the second fiber layer.

When the multilayer nonwoven fabric is used as a surface sheet, it is preferable that fibers obtained by kneading a hydrophilic agent, a water-repellant agent, or the like into hydrophobic synthetic fibers taken as an example in the foregoing, or coating the fibers with the agent in consideration of absorption and leaching of a liquid, for example. Fibers that have been given hydrophilic properties by corona treatment or plasma treatment may be used.

In order to enhance the whitening properties of the multilayer nonwoven fabric, an inorganic filler such as titanium oxide, barium sulfate, and calcium carbonate may be included. In the case of core-sheath conjugate fibers, the inorganic filler may be contained only in cores. Alternatively, it may be also contained in sheaths.

Furthermore, a fiber web produced by a carding process using relatively long fibers makes it easy to rearrange the fibers by air flow, as previously described. In order to form groove portions (irregularities) by a plurality of air flows and then hold the shape thereof, a through-air process for thermally fusing thermoplastic fibers by oven treatment (heat treatment) is preferable. Preferably used as fibers suitable for this manufacturing process are fibers having a core-sheath structure of a side-by-side type for thermally fusing intersections of the fibers and further fibers having a core-sheath structure in which sheaths are reliably thermally fused to one another. Particularly, it is preferable to use core-sheath conjugate fibers composed of polyethylene terephthalate and polyethylene and core-sheath conjugate fibers composed of polypropylene and polyethylene. Further, the fiber length of fibers composing a nonwoven fabric (fiber web) is 20 to 100 mm, and preferably 35 to 65 mm.

10-3. Fiber Orientation

"Fibers are oriented in a longitudinal direction (machine direction (MD))" means that fibers are oriented at an angle of +45 degrees to −45 degrees to a longitudinal direction. Fibers oriented in the longitudinal direction are referred to as "longitudinally-oriented fibers". "Fibers are oriented in a width direction (cross direction (CD))" means that fibers are oriented at an angle of +45 degrees to −45 degrees to a width direction of the nonwoven fabric which is orthogonal to the longitudinal direction (MD)). Fibers oriented in the width direction are referred to as "laterally-oriented fibers".

The fiber orientation were measured by the following measuring method using a digital microscope VHX-100 manufactured by KEYENCE CORPORATION. That is, the fiber orientation can be calculated and measured by (1) setting a sample on an observation stand in the longitudinal direction (machine direction (MD)), (2) focusing a lens on foremost fibers in the sample excluding fibers irregularly projected forward, (3) setting the photographic depth (depth) to produce a 3D image of the sample on a PC screen, (4) converting the 3D image into a 2D image, (5) drawing a plurality of parallel lines for appropriately equally dividing the length in a measurement range, (6) observing, in each of cells obtained by drawing the parallel lines to subdivide the screen, whether the fibers are oriented in the machine direction (MD) or the cross direction (CD), and measuring the number of fibers oriented in each of the directions, and (7) calculating the ratio of the number of fibers oriented in the machine direction (MD) and the ratio of the number of fibers oriented in the cross direction (CD) to the total number of fibers within a set range.

10-4. Fluid Mainly Composed of Gas

An example of a fluid mainly composed of gas in the present invention is gas adjusted to a normal temperature or a predetermined temperature or an aerosol in which solid or liquid fine particles are contained in the gas.

Examples of the gas include air and nitrogen. The gas may contain a liquid vapor such as a water vapor.

The aerosol is obtained by dispersing a liquid or a solid in gas. Examples thereof follow: ones obtained by dispersing ink for coloring, a softening agent such as silicon for enhancing flexibility, a hydrophilic or water-repellent activator for controlling antistatic properties and wettability, an inorganic filler such as titanium oxide or barium sulfate for enhancing energy of a fluid, a powder bond such as polyethylene for enhancing energy of a fluid as well as enhancing irregular molding maintenance properties in heat treatment, an antihistamine such as diphenhydramine hydrochloride or isopropyl methyl phenol for preventing itching, a humectant, a bactericide, and so on. Here, the solid include a gel-like solid.

The temperature of the fluid mainly composed of gas can be appropriately adjusted. The temperature of the fluid can be appropriately adjusted depending on the property of fibers composing a fiber aggregate, the fiber orientation, the fiber density, or the basis weight in a multilayer nonwoven fabric to be manufactured, and the shape of predetermined groove portions or opening.

Here, in order to suitably displace the fibers composing the fiber aggregate, for example, it is preferable that the temperature of the fluid mainly composed of gas is high to some extent because the degree of freedom of the fibers composing the fiber aggregate is increased. When the fiber aggregate contains thermoplastic fibers, it can be configured so as to soften or melt and harden again the thermoplastic fibers arranged in an region on which the fluid mainly composed of gas has been sprayed, for example, by setting the temperature of the fluid mainly composed of gas to a temperature at which the thermoplastic fibers can be softened.

This causes the fiber orientation, the fiber density, the basis weight, or the like and the shape of the groove portions or the openings to be maintained by spraying the fluid mainly composed of gas, for example. When the fiber aggregate is displaced by predetermined moving means, for example, it is given such a degree of strength that the fiber aggregate (the multilayer nonwoven fabric) does not disperse.

The flow rate of the fluid mainly composed of gas can be appropriately adjusted depending on an objective fiber orientation, fiber density, or basis weight and an objective shape of grooves or openings. Specific examples of the fiber aggregate composed of fibers having a degree of freedom include a fiber web 100 adjusted to 10 to 1000 g/m2 and preferably 15 to 100 g/m2 using fibers mainly composed of core-sheath fibers respectively composed of high-density polyethylene and polyethylene terephthalate as sheaths and cores, having a fiber length of 20 to 100 mm and preferably 35 to 65 mm, and having a fineness of 1.1 to 8.8 dtex and preferably 2.2 to 5.6 dtex, and having a fiber length of 20 to 100 mm and preferably 35 to 65 mm if they are opened by a carding process, while having a fiber length of 1 to 50 mm and preferably 3 to 20 if they are opened by an airlaid process. It is possible to exemplify a case where the conditions of the fluid, mainly composed of gas, is hot air with a temperature of 15 to 300 degrees C. (288.15K to 573.15K) and preferably 100 to 200 degrees C. (373.15K to 473.15K) and is sprayed on the fiber web 100 under conditions of an air volume rate of 3 to 50 [L/(minute per hole)] and preferably 5 to 20 [L/(minute per hole)] in the spray portion 910 having the plurality of spray ports 913 formed therein, shown in FIG. 8 or 9 (the spray ports 913 may be configured as follows; the diameter is 0.1 to 30 mm and preferably 0.5 to 5 mm, the pitch therebetween is 0.5 to 30 mm and preferably 0.1 to 10 mm, the shape is a complete round, an ellipse, or a rectangle). When the fluid mainly composed of gas is sprayed under the foregoing conditions, for example, the fiber aggregate composed of fibers whose positions and directions can be changed is one of suitable fiber aggregates in the present invention. The above-mentioned multilayer nonwoven fabric can be molded, for example, by being manufactured under the above-mentioned manufacturing conditions using such fibers. The multilayer nonwoven fabric can be manufactured such that the sizes and the basis weights region in the region constituting the bottom of the groove portion 1 and the raised ridge portion 2 are respectively in the following ranges. In the region constituting the bottom of the groove portion 1, the thickness is in a range of 0.05 to 10 mm and preferably 0.1 to 5 mm, the width is in a range of 0.1 to 30 mm and preferably 0.5 to 5 mm, and the basis weight is in a range of 2 to 900 g/m2 and preferably 10 to 90 g/m2. In the raised ridge portion 2, the thickness is in a range of 0.1 to 15 mm and preferably 0.5 to 10 mm, the width is in a range of 0.5 to 30 mm and preferably 1.0 to 10 mm, and the basis weight is in a range of 5 to 1000 g/m2 and preferably 10 to 100 g/m2. Here, although the multilayer nonwoven fabric can be produced in roughly the above-mentioned numerical range, the present invention is not limited to the numerical range.

The fiber aggregate can contain thermoplastic fibers, for example. When the fiber aggregate contains the thermoplastic fibers, the fluid mainly composed of gas sprayed on an upper surface that is the second surface of the fiber aggregate from predetermined spraying means can be set to a temperature that is greater than the predetermined temperature at which the thermoplastic fibers can be softened, for example.

For example, the fiber aggregate can be so configured as to soften or melt and harden again the thermoplastic fibers arranged in the region or the like on which the fluid mainly composed of gas has been sprayed by setting the temperature of the fluid mainly composed of gas to the temperature at which the thermoplastic fibers soften. This causes the fiber orientation, the fiber density, or the basis weight and the shape of the groove portions or the openings to be maintained by spraying the fluid mainly composed of gas, for example. When the fiber aggregate is moved by predetermined moving means, for example, the fiber aggregate (the multilayer nonwoven fabric) is given such a degree of strength that it does not disperse when it is moved by predetermined moving means. In addition thereto, the contents of the fibers and the fluid mainly composed of gas can refer to the above-mentioned description.

10-5. Multilayer Nonwoven Fabric Manufacturing Apparatus 10-5-1. Permeable Supporting Member An example of a permeable supporting member is a supporting member through which a fluid mainly composed of gas that has been sprayed from the spray portion 910 shown in FIG. 6 and has permeated the fiber web 100 can be moved to the side opposite to the side on which the fiber web 100 is placed.

An example of the supporting member that the fluid mainly composed of gas can permeate without almost changing the direction of flow thereof is the mesh-shaped supporting member 210 shown in FIG. 4. The mesh-shaped supporting member 210 can be produced by a fine mesh-shaped member formed in such a manner that thin wires are braided, for example. Furthermore, the mesh-shaped supporting member 210 is a permeable supporting member in which meshes serving as a first permeable portion, described later, are wholly arranged.

The permeable supporting member can comprise a permeable portion that the fluid mainly composed of gas sprayed from above the upper surface of the fiber web 100 can permeate toward the side (underside), opposite to the side on which the fiber web 100 is arranged, of the permeable supporting member and an impermeable portion that the fluid mainly composed of gas sprayed from above the upper surface of the fiber web 100 cannot permeate toward the underside of the permeable supporting member and through which the fibers 101 and 102 composing the fiber web 100 cannot be displaced toward the underside of the permeable supporting member.

Examples of the permeable supporting member include a supporting member in which impermeable members are arranged by predetermined patterning in a predetermined mesh-shaped member and a supporting member in which a plurality of predetermined holes are formed in an impermeable plate-shaped member.

Figure 15:
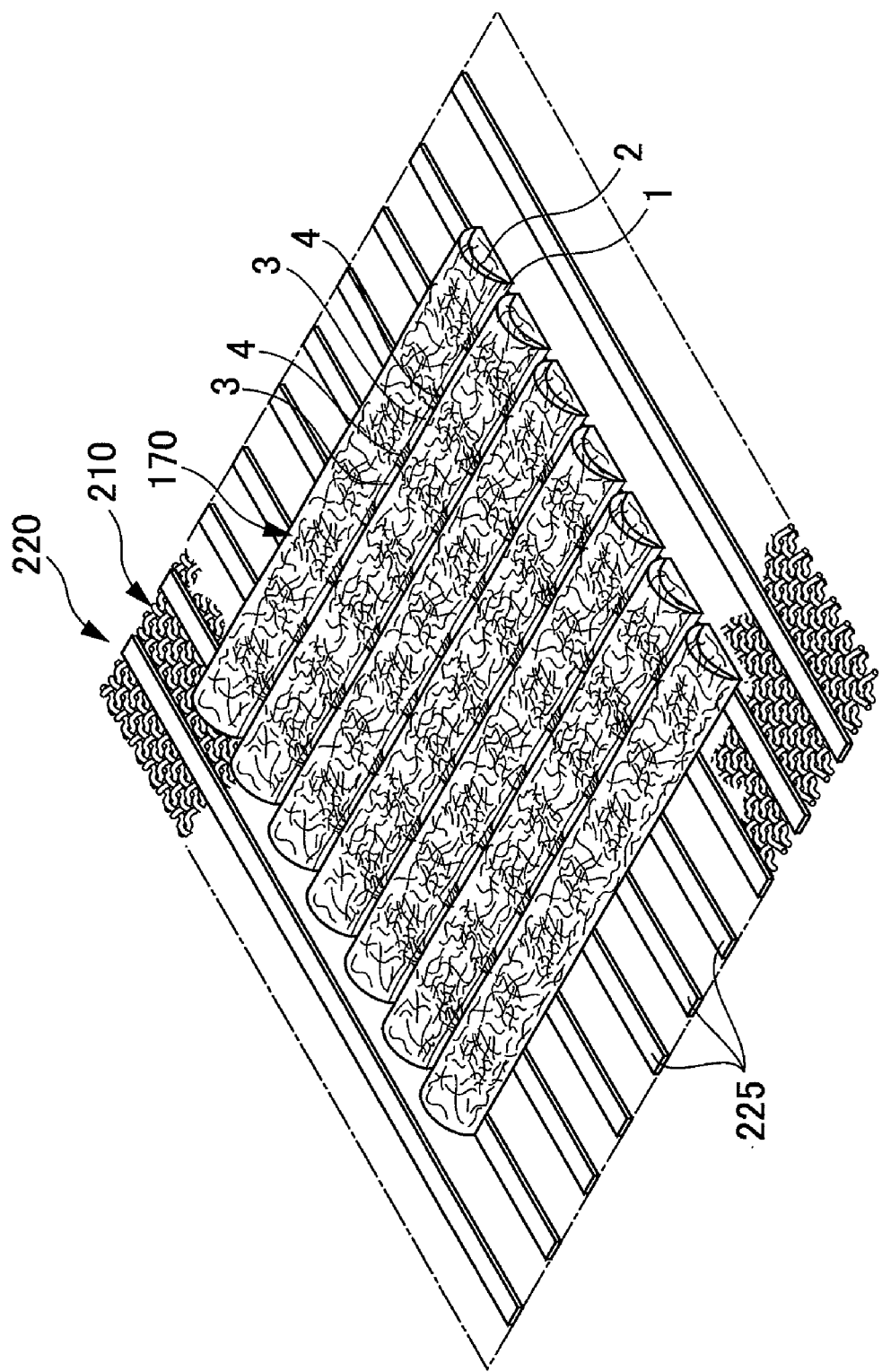
FIG. 15 is a diagram showing a state where gas is sprayed on an upper surface of the fiber web shown in FIG. 1 with a lower surface of the fiber web supported on the supporting member shown in FIG. 14A or 14B, to manufacture the multilayer nonwoven fabric according to the fourth embodiment shown in FIG. 12.

An example of the supporting member in which the impermeable members are arranged by predetermined patterning in the predetermined mesh-shaped member is a supporting member 220 in which elongated members 225 serving as the impermeable members are equally spaced in parallel on a first surface of the mesh-shaped supporting member 210 shown in FIG. 15. Here, a supporting member obtained by appropriately changing the shape and the arrangement of the elongated members 225 serving as the impermeable members can be taken as another example. The impermeable portion can be also formed by filling in the meshes serving as the permeable portion (with solder, resin, etc., for example) besides arranging the elongated members 225 on the first surface of the mesh-shaped supporting member 210.

An example of the supporting member in which the plurality of predetermined holes are formed in the impermeable plate-shaped supporting member is a plate-shaped supporting member 230 having a plurality of elliptical holes 223 serving as a permeable portion formed therein, as shown in FIG. 19A or 19B. Here, a plate-shaped supporting member obtained by appropriately adjusting the shape, the size, and the arrangement of the holes 233 can be taken as another example. In other words, a plate-shaped supporting member obtained by appropriately adjusting the shape and others of a plate 235 serving as an impermeable portion can be taken as another example.

Here, the permeable portion in the permeable supporting member comprises a first permeable portion through which the fibers composing the fiber web 100 cannot be substantially displaced to the side (underside), opposite to the side on which the fiber web 100 is placed, of the permeable supporting member and a second permeable portion through which the fibers composing the fiber aggregate can be displaced to the underside of the permeable supporting member.

An example of the first permeable portion is a mesh-shaped region in the mesh-shaped supporting member 210. An example of the second permeable portion is the holes 233 in the plate-shaped supporting member 230.

An example of the permeable supporting member having the first permeable portion is the mesh-shaped supporting member 210. An example of the permeable supporting member having the impermeable portion and the first permeable portion is the supporting member 220. An example of the supporting member having the impermeable portion and the second permeable portion is the plate-shaped supporting member 230.

Other examples include a permeable supporting member comprising a first permeable portion and a second permeable portion and a permeable supporting member comprising an impermeable supporting member, a first permeable portion and a second permeable portion. An example of the permeable supporting member comprising the first permeable portion and the second permeable portion is a permeable supporting member obtained by forming a plurality of openings in the mesh-shaped supporting member 210. An example of the permeable supporting member comprising the impermeable supporting member, the first permeable portion, and the second permeable portion is a permeable supporting member obtained by forming a plurality of openings in the mesh-shaped region in the supporting member 220.

An example of the permeable supporting member is a supporting member having a surface, on which the fiber web 100 is supported, in a substantially plane shape or a substantially curved surface shape and being substantially flat. Examples of the substantially plane shape or the substantially curved surface shape include a plate shape and a cylindrical shape. "Substantially flat" means that the surface, on which the fiber web 100 is placed, of the supporting member is not formed in an irregular shape or the like, for example. A specific example is a supporting member in which the meshes of the mesh-shaped supporting member 210 are not formed in an irregular shape or the like.

Examples of the permeable supporting member include a plate-shaped supporting member and a cylindrical supporting member. Specific examples include the mesh-shaped supporting member 210, the supporting member 220, and the plate-shaped supporting member 230, described above, and a permeable supporting drum.

Here, the permeable supporting member can be removably arranged in the multilayer nonwoven fabric manufacturing apparatus 90. This allows the permeable supporting member to be appropriately arranged depending on a desired fiber orientation, fiber density, or basis weight and the shape of predetermined groove portions or openings in a desired multilayer nonwoven fabric. In other words, in the multilayer nonwoven fabric manufacturing apparatus 90, the permeable supporting member can be replaced with another permeable supporting member selected out of a plurality of different permeable supporting members. It can be said that the present invention comprises the multilayer nonwoven fabric manufacturing apparatus 90 and a plurality of different permeable supporting members, for example.

A mesh-shaped portion in the mesh-shaped supporting member 210 or the supporting member 220 will be described below. Examples of the permeable mesh-shaped portion include a permeable net plain-woven, twill-woven, satin-woven, double-woven, or spiral-woven with threads made of resin such as polyester, polyphenylene sulfide, nylon, or a conductive monofilament or threads made of a metal such as stainless, copper, or aluminum.

Permeability in the permeable net can be partially changed by partially changing a weaving method and the thickness and the shape of the threads, for example. Specific examples include a permeable mesh spiral-woven with threads made of polyester and a permeable mesh spiral-woven with flat and circular threads made of stainless.

In place of the elongated members 225 arranged on a first surface of the supporting member 220, the permeable net may be coated with silicon resin or the like by patterning, and an impermeable material may be partially jointed thereto. For example, a 20-mesh permeable net plain-woven with threads made of polyester can be coated with silicon resin so as to extend in a cross direction and so as to be repeated in a machine direction. In this case, this portion is an impermeable portion to which silicon resin or an impermeable material is joined, and the other portion is a first permeable portion. In the impermeable portion, it is preferable that the surface is smooth in order to enhance the sliding properties of the surface.

Examples of the plate-shaped supporting member 230 include a sleeve made of a metal such as stainless, copper, or aluminum. An example of the sleeve is one obtained by partially cutting the metal in a predetermined pattern. A portion from which the metal is cut is a second permeable portion, and a portion from which the metal is not cut is an impermeable portion. In the impermeable portion, it is preferable that the surface is smooth in order to enhance the sliding properties of the surface, as described above.

Examples of the sleeve include a sleeve made of stainless having a thickness of 0.3 mm in which holes obtained by cutting the metal to a horizontally long rectangle having a length of 3 mm and a width of 40 mm and having rounded corners are arranged in a lattice shape, spaced 2 mm apart in a longitudinal direction and spaced 3 mm apart in a cross direction.

Examples of the sleeve include a sleeve having holes arranged therein in a zigzag shape. An example of the sleeve is a sleeve made of stainless steel having a thickness of 0.3 mm in which holes obtained by cutting a metal to a circle having a diameter of 4 mm are arranged in a zigzag shape with a pitch of 12 mm in a longitudinal direction (machine direction (MD)) and with a pitch of 6 mm in a width direction (cross direction (CD)). The arrangement of patterns to which the metal is cut and the holes to be formed by cutting the metal in the sleeve can be appropriately set.

Furthermore, a permeable supporting member provided with a rise and fall in a thickness direction can be taken as an example. An example of the permeable supporting member is a permeable supporting member in which portions, on which a fluid mainly composed of gas is not directly sprayed, alternately rise and fall (e.g., in a wave shape) in a longitudinal direction (machine direction (MD)). The use of the permeable supporting member in such a shape makes it possible to obtain a multilayer nonwoven fabric in which the fiber orientation, the fiber density, or the basis weight is adjusted and predetermined groove portions or openings are formed, and whose overall shape is produced so as to correspond to the alternate rise and fall (e.g., in a wave shape) in the permeable supporting member.

Here, in a case where a permeable supporting member has a different configuration, the fiber orientation, the fiber density, or the basis weights region of the fibers in the fiber web 100 and the shape and the size of groove portions or openings to be formed are changed into entirely different ones even if gas is sprayed on a multilayer nonwoven fabric from the spray portion 910 under the same conditions. In other words, a multilayer nonwoven fabric adjusted to a desired fiber orientation, fiber density, and basis weight and a multilayer nonwoven fabric having groove portions or openings in a desired shape formed therein can be obtained by appropriately selecting the permeable supporting member.

One of the features of the multilayer nonwoven fabric manufacturing apparatus 90 in the present embodiment is that it can manufacture a multilayer nonwoven fabric in which the fiber orientation, the fiber density, or the basis weight is adjusted and predetermined groove portions or openings are formed by continuously spraying a fluid mainly composed of gas on the fiber web 100 serving as a fiber aggregate from the spraying means.

10-5-2. Moving Means

Moving means move in a predetermined direction the (multilayer) fiber web 100 serving as a fiber aggregate with the first surface supported on the above-mentioned permeable supporting member. Specifically, the moving means moves in a predetermined direction F the fiber web 100 with a fluid mainly composed of gas sprayed thereon. Examples of the moving means include the conveyer 930 shown in FIG. 6. The conveyer 930 comprises a permeable belt 939 having permeability formed in a horizontally long ring shape on which the permeable supporting member is placed, and rotating portions 931 and 933 arranged at both ends in the machine direction inside the permeable belt 939 for rotating the permeable belt 939 in a predetermined direction. Here, in a case where the permeable supporting member is the mesh-shaped supporting member 210 or the supporting member 220, the above-mentioned permeable belt 939 may not, in some cases, be arranged. In a case where the permeable supporting member is a supporting member having a large hole formed therein, for example, the plate-shaped supporting member 230, it is preferable that the permeable belt 939 is arranged in order to inhibit the fibers composing the fiber web 100 from being dropped from the hole to enter a machine employed in the steps, for example. A preferable example of the permeable belt 939 is a mesh-shaped belt.

The conveyer 930 moves in the predetermined direction F the permeable supporting member with the fiber web 100 supported from below its lower surface, as described above. Specifically, the fiber web 100 is moved so as to pass through the underside of the spray portion 910. Further, the fiber web 100 is moved so as to pass through the inside of a heater 950, whose side surfaces are opened, serving as heating means.

Examples of the moving means include a combination of a plurality of conveyers. Such a configuration allows the fiber orientation, the fiber density, or the basis weight and the shape and others of the groove portions or the openings in the multilayer nonwoven fabric to be adjusted by appropriately adjusting the speed at which the multilayer nonwoven fabric moves nearer to the spray portion 910 and the speed at which the multilayer nonwoven fabric moves away from the spray portion 910. The details will be described later.

In addition thereto, the multilayer nonwoven fabric heated by the heater 950 is moved to the step of cutting the multilayer nonwoven fabric to a predetermined shape and the step of rewinding the multilayer nonwoven fabric, for example, by a conveyer 940 connecting with the conveyer 930 in the predetermined direction F. The conveyer 940 comprises a belt 949 and a rotating portion 941, similarly to the conveyer 930.

10-5-3. Spraying Means

Spraying means comprises the air supply portion (not shown) and the spray portion 910. The air supply portion (not shown) is connected to the spray portion 910 through an air supply pipe 920. The air supply pipe 920 is connected to the top of the spray portion 910 so as to be permeable. The spray portion 910 has a plurality of spray ports 913 formed therein with predetermined spacing.

Gas supplied to the spray portion 910 from the air supply portion (not shown) through the air supply pipe 920 is sprayed from the plurality of spray ports 913 formed in the spray portion 910. The gas sprayed from the plurality of spray ports 913 is continuously sprayed on the upper surface of the fiber web 100 supported from the lower surface thereof on the permeable supporting member. Specifically, the gas sprayed from the plurality of spray ports 913 is continuously sprayed on the upper surface of the fiber web 100 with the permeable supporting member moved in the predetermined direction F by the conveyer 930.

A suction portion 915 arranged below the spray portion 910 and arranged on the underside of the permeable supporting member sucks gas or the like that has been sprayed from the spray portion 910 and has further permeated the permeable supporting member. Here, the suction by the suction portion 915 allows the fiber web 100 to be positioned so as to be stretched over the permeable supporting member. Further, the suction allows the fiber web 100 to be conveyed into the heater 950 with the shape of groove portions (irregularities) or the like molded by air flow kept. That is, it is preferable that the fiber web 100 is heated by the heater 950 from the time of the molding by the air flow and is conveyed while sucking the gas from below by the suction portion 915.

For example, a multilayer nonwoven fabric 110 in which groove portions 1 are spaced a predetermined distance apart on an upper surface of a fiber web 100 by a fluid mainly composed of gas sprayed from spray ports 913 spaced a predetermined distance apart in a cross direction of the fiber web 100 is manufactured.

Examples of the spray portion 910 include one in which the diameter of spray ports 913 is 0.1 to 30 mm and preferably 0.3 to 10 mm and the pitch between the spray ports 913 is 0.5 to 20 mm and preferably 3 to 10 mm.

Examples of the shape of the spray port 913 include, but are not limited to, a substantially circle, an ellipse, a square, and a rectangle. Examples of the cross-sectional shape of the spray port 913 include, but are not limited to, a cylinder, trapezoid, and an inverted trapezoid. Considering that air is efficiently sprayed on the fiber web 100, it is preferable that the shape is a complete circle and the cross-sectional shape is a cylinder.

The spray port 913 can be designed, for example, depending on a desired fiber orientation, fiber density, or basis weight and predetermined grooves or openings in the multilayer nonwoven fabric. The respective hole diameters and shapes of the plurality of spray ports 913 may differ from one another. Alternatively, the spray ports 913 may be formed in a plurality of lines in the spray portion 910.

The temperature of a fluid mainly composed of gas sprayed from each of the spray ports 913 may be a normal temperature, as described above. In order to improve the molding properties of groove portions (irregularities) or openings, for example, however, the temperature of the fluid can be adjusted to a temperature that is not less than the softening point of at least thermoplastic fibers composing the fiber aggregate and preferably not less than the softening point nor greater than a melting point of +50 degrees C. When the fibers are softened, the repulsive force of the fibers themselves is reduced. Therefore, the shape of the fibers rearranged by air flow or the like is easily kept. When the temperature is further increased, thermal fusion between the fibers commences so that the shape of the groove portions (irregularities) or the like can be more easily kept. This makes it easy to convey the fiber web 100 into the heater 950 with the shape of the groove portions (irregularities) or the like kept.

In order to convey the fiber web 100 to the heater 950 with the shape of the groove portions (irregularities) or the like molded by air flow or the like kept, the fiber web 100 can be conveyed into the heater 950 immediately after or simultaneously with the molding of the groove portions (irregularities) or the like by air flow or the like. Alternatively, the fiber web 100 can be conveyed to the heater 950 after being cooled by cold air or the like immediately after molding of the groove portions (irregularities) or the like by hot air (air flow with a predetermined temperature).

Here, examples of elements for displacing the fibers in the fiber web 100 to adjust the fiber orientation, the fiber density, or the basis weight of the fibers and the shape, the size, and others of the groove portions or the openings to be formed in addition to the above-mentioned configuration of the permeable supporting member include the flow velocity and the flow rate of the gas sprayed from the spray portion 901. The flow velocity and the flow rate of the sprayed gas can be adjusted depending on the amount of supplied air or the like in the air supply portion (not shown) and the number and the bore diameter of the spray ports 913 formed in the spray portion 910, for example.

In addition thereto, the spacing between the groove portions 1 and the height of the raised ridge portions 2 in the irregularities to be formed, and so on can be appropriately adjusted, for example, by making the direction of the fluid mainly composed of gas to be sprayed from the spray portion 910 changeable. Further, the groove portions or the like can be appropriately adjusted to have a snaked shape (a wave shape or a zigzag shape) and other shapes, for example, by making the direction of the fluid automatically changeable, for example. The shape and the formation pattern of the groove portions or the openings can be appropriately adjusted by adjusting the spraying amount of the fluid mainly composed of gas and a time period required to spray the fluid. An angle at which the fluid mainly composed of gas is sprayed on the fiber web 100 may be vertical. Alternatively, in the movement direction F of the fiber web 100, the fluid mainly composed of gas may be sprayed at a predetermined angle to the machine direction serving as the movement direction F or may be sprayed at a predetermined angle to a direction opposite to the machine direction.

10-5-4. Heating Means

The heater 950 serving as the heating means is opened at both its end as viewed from the predetermined direction F. This causes the fiber web 100 (the multilayer nonwoven fabric 110) placed on the permeable supporting member moved by the conveyer 930 to be conveyed to a heating space formed inside the heater 950 to stay for a predetermined time period and to be then conveyed outward. In a case where the fibers 101 composing the fiber web 100 (the multilayer nonwoven fabric 110) includes thermoplastic fibers, the fibers are fused by heating in the heater 950, and are conveyed outward to be cooled, which allows a multilayer nonwoven fabric in which fibers are fused at their intersections to be obtained.

Examples of a method of bonding the fibers 101 and 102 in the multilayer nonwoven fabric 110 in which the fiber orientation, the fiber density, or the basis weight is adjusted and/or one or two or more of predetermined groove portions, openings, and raised ridge portions are formed include bonding using a needle punching process, a spun lacing process, and a solvent bonding process and heat bonding using a point bonding process and an air-through process. In order to bond the fibers with the adjusted fiber orientation, fiber density, or basis weight and the shape of the formed predetermined groove portions, openings, or raised ridge portions maintained, the air-through process is preferable. A preferable example is heat treatment in the air-through process by the heater 950.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A method of manufacturing a multilayer nonwoven fabric, said method comprising:
   a supporting step of arranging on a side of a permeable supporting member a multilayer fiber aggregate having,
     a first fiber aggregate having opposite first and second surfaces and arranged as a first fibrous sheet in a state where fibers composing the first fiber aggregate have a degree of freedom, and
     a second fiber aggregate arranged as a second fibrous sheet facing the first surface of the first fiber aggregate and being in a state where fibers composing the second fiber aggregate have a degree of freedom, said second fiber aggregate being positioned between the first fiber aggregate and the permeable supporting member to support the first fiber aggregate on the permeable supporting member;
   a moving step of moving the multilayer fiber aggregate supported on the permeable supporting member in a first direction by a moving device; and
   a spraying step of spraying a fluid composed of gas onto the multilayer fiber aggregate moved in the first direction in the moving step from the second surface of the first fiber aggregate by a spraying device to form in said multilayer fiber aggregate a plurality of raised ridge portions and a plurality of groove portions on both sides of each of the raised ridge portions, thereby obtaining the multilayer nonwoven fabric.

2. The method according to claim 1, wherein the permeable supporting member comprises a plurality of permeable portions and a plurality of impermeable portions arranged alternatingly in the first direction,
   each permeable portion permits the fluid sprayed onto the multilayer fiber aggregate to permeate to a side opposite to the side on which the multilayer fiber aggregate is arranged, and
   each impermeable portion does not permit the fluid, sprayed on the multilayer fiber aggregate to permeate to the opposite side,
   in the spraying step, the fluid is sprayed on a plurality of first regions of the multilayer fiber aggregate to form the groove portions, and to move the fibers from the first regions to a plurality of second regions of the multilayer fiber aggregate to form the raised ridge portions, wherein the first and second regions are alternatingly arranged in a second direction substantially perpendicular to the first direction.

3. The method according to claim 2, wherein
each of the groove portions has a plurality of low basis weight portions and a plurality of high basis weight portions alternatingly arranged in the first direction,
in the spraying step, the fluid is sprayed on a plurality of first areas of each said first region, which are supported on the permeable portions of the permeable supporting member to form the low basis weight portions, respectively, and
in the spraying step, the fluid is sprayed on a plurality of second areas of each said first region, which are supported on the impermeable portion of the permeable supporting member to form the high basis weight portions.

4. The method according to claim 3, wherein
in the spraying step, the fibers composing the multilayer fiber aggregate are displaced by (i) the fluid sprayed on the multilayer fiber aggregate from the second surface of the first fiber aggregate, and (ii) the fluid which, after permeating the multilayer fiber aggregate, has a direction of flow modified by the impermeable portions.

5. The method according to claim 3, wherein each said low basis weight portion is an opening.

6. The method according to claim 1, wherein the spraying step forms in each said raised ridge portion an apex of a curved surface between the adjacent groove portions.

7. The method according to claim 1, wherein the fluid consists of gas.

8. The method according to claim 1, wherein the fluid is mainly gas and includes solid or liquid particles.

9. The method according to claim 2, wherein the permeable portions of the permeable supporting member are defined by a meshed supporting member.

10. The method according to claim 2, wherein
the permeable portions of the permeable supporting member are defined by a meshed supporting member though which the fibers composing the multilayer fiber aggregate are displaceable during the spraying step; and
the impermeable portions of the permeable supporting member are defined by a plurality of elongated members arranged on the meshed supporting member and through which the fibers composing the multilayer fiber aggregate are not displaceable during the spraying step.

11. The method according to claim 10, wherein
the elongated members arranged on the meshed supporting member longitudinally extend in the second direction.

12. The method according to claim 9, wherein said meshed supporting member has a plurality of raised portions and groove portions arranged alternatingly in the first direction.

13. The method according to claim 2, wherein
the permeable supporting member is defined by a plate member which is substantially flat and includes a plurality of holes and solid flat regions around the holes, said holes and solid flat regions defining the permeable portion and the impermeable portion of the permeable supporting member, respectively.

* * * * *